(12) United States Patent
Strahle et al.

(10) Patent No.: US 10,874,938 B2
(45) Date of Patent: *Dec. 29, 2020

(54) VIDEO GAME CONTROLLER

(71) Applicant: Performance Designed Products LLC, San Diego, CA (US)

(72) Inventors: Bradley M. Strahle, Crestline, CA (US); Yannik Wiggemans, Studio City, CA (US)

(73) Assignee: Performance Designed Products LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/573,929

(22) Filed: Sep. 17, 2019

(65) Prior Publication Data
US 2020/0054942 A1 Feb. 20, 2020

Related U.S. Application Data

(63) Continuation of application No. 16/004,102, filed on Jun. 8, 2018, now Pat. No. 10,427,037.

(60) Provisional application No. 62/518,507, filed on Jun. 12, 2017.

(51) Int. Cl.
| | | |
|---|---|---|
| *A63F 13/24* | (2014.01) | |
| *A63F 13/98* | (2014.01) | |
| *A63F 13/22* | (2014.01) | |
| *A63F 13/285* | (2014.01) | |

(52) U.S. Cl.
CPC .............. *A63F 13/24* (2014.09); *A63F 13/22* (2014.09); *A63F 13/285* (2014.09); *A63F 13/98* (2014.09)

(58) Field of Classification Search
None
See application file for complete search history.

(56) References Cited

U.S. PATENT DOCUMENTS

| | | | |
|---|---|---|---|
| 4,575,591 | A | 3/1986 | Lugaresi |
| 5,883,690 | A | 3/1999 | Meyers et al. |
| 7,758,424 | B2 | 7/2010 | Riggs |
| 8,221,229 | B2 | 7/2012 | Mikhailov |
| | | (Continued) | |

FOREIGN PATENT DOCUMENTS

| | | |
|---|---|---|
| EP | 1078660 A1 | 2/2001 |
| WO | WO 2005/110568 A2 | 11/2005 |
| | (Continued) | |

OTHER PUBLICATIONS

International Search Report and Written Opinion received in PCT/US2018/036758 dated Jan. 22, 2019, 22 pages.

(Continued)

*Primary Examiner* — Ronald Laneau
(74) *Attorney, Agent, or Firm* — Knobbe, Martens, Olson & Bear LLP

(57) ABSTRACT

A video game controller can include a body with a top surface and a bottom surface, multiple control inputs (e.g., thumbsticks, directional pads, buttons), and a face plate removably coupleable to the body over the top surface so that the plurality of control inputs extend through the face plate. One or more of the multiple control inputs are removable and replaceable without the use of tools by decoupling the face plate from the body and decoupling the control input from the body without disassembling the body.

20 Claims, 23 Drawing Sheets

(56) References Cited

U.S. PATENT DOCUMENTS

| | | |
|---|---|---|
| 8,795,077 B1 | 8/2014 | Musick, Jr. |
| 9,710,072 B1 | 7/2017 | Strahle et al. |
| 9,764,230 B2 | 9/2017 | Gassoway |
| 9,804,691 B1 | 10/2017 | Strahle et al. |
| 9,811,172 B1 | 11/2017 | Strahle et al. |
| 9,868,058 B2 | 1/2018 | Gassoway |
| 10,441,881 B2 | 10/2019 | Burgess |
| 2004/0155862 A1 | 8/2004 | Higginson |
| 2005/0255915 A1 | 11/2005 | Riggs et al. |
| 2005/0255916 A1* | 11/2005 | Chen .................. A63F 13/98 463/37 |
| 2006/0025217 A1 | 2/2006 | Hussaini |
| 2006/0211498 A1 | 9/2006 | Higgins et al. |
| 2008/0261693 A1 | 10/2008 | Zalewski |
| 2009/0183193 A1 | 7/2009 | Miller, IV |
| 2010/0298053 A1* | 11/2010 | Kotkin .................. A63F 13/24 463/37 |
| 2011/0105231 A1 | 5/2011 | Ambinder et al. |
| 2012/0274563 A1 | 11/2012 | Olsson |
| 2012/0302347 A1 | 11/2012 | Nicholson |
| 2014/0018173 A1 | 1/2014 | Urhman |
| 2017/0151494 A1 | 6/2017 | Ironmonger |
| 2018/0188826 A1 | 7/2018 | Strahle |

FOREIGN PATENT DOCUMENTS

| | | |
|---|---|---|
| WO | WO 2005/113094 A1 | 12/2005 |
| WO | WO 2015/078995 A1 | 6/2015 |
| WO | WO 2016/110586 | 7/2016 |
| WO | WO 2016/200551 A1 | 12/2016 |

OTHER PUBLICATIONS

Joe Robinson, Mad Catz MLG Pro Circuit Controller Review, published Apr. 18, 2012 on 2 Gamewatcher.com at https://www.gamewatcher.com/editorials/mad-catz-mlg-pro-circuit-controller-review/11890#, 5 pages.

Mad Catz MLG Pro Circuit Controller review & comparison, published Jan. 20, 2012 on Driph. com at http://driph.com/words/2012/01 /mad-catz-mlg-pro-circuit-controller-review- • • comparison/, 11 pages.

PCT Invitation to Pay Additional Fees regarding International Application No. PCT/US2018/036758, dated Nov. 30, 2018, 17 pages.

Sean Buckley, Mad Catz MLG Pro Circuit Controller Review (PS3), published Jan. 29, 2012 on 1 Engadget.com at https://www.engadget.com/2012/01 /29/mad-catz-mlg-pro-circuit-controller-review-ps3/, 11 pages.

* cited by examiner

VIDEO GAME CONTROLLER

CROSS-REFERENCE TO RELATED APPLICATIONS

Any and all applications for which a foreign or domestic priority claim is identified in the Application Data Sheet as filed with the present application are hereby incorporated by reference under 37 CFR 1.57, and should be considered a part of this specification.

BACKGROUND

Field

The present invention is directed to video game controllers, and more particularly to video game controllers with removeable components that improve the serviceability of the controller.

Description of the Related Art

Video gaming is very popular and has become increasingly complex, requiring video game controllers with multiple inputs (e.g., buttons, thumbsticks, directional pads, paddles, etc.) that can be actuated (e.g., pressed, pivoted, pulled, etc.) to activate functions within the video game. As the inputs are actuated, electrical signals are generated, processed and/or transmitted to a gaming console to which the controller connects. The console operates the video game at least in part based on the signals it receives from the controller. There are different gaming consoles in the market, and each console may use a different type of controller (e.g., having different types or combination of inputs).

Current video game controllers can be costly due, at least partially, to their complexity. The control inputs wear down or wear out, some more quickly than others (e.g., based on how often an input is used in a video game), or sometimes fail to perform their intended functionality. Replacing the whole controller once one or more inputs no longer function can be costly, and replacing individual components can be very difficult and time consuming, requiring the use of tools to take apart the video game controller to access the internals of the controller. Additionally, the inputs may not be easily removable (e.g., may have soldered electrical connections).

SUMMARY

In accordance with one aspect of the invention, a video game controller is provided with a face plate that can be readily decoupled from the body of the video game controller, and that has inputs that are readily removably, thereby facilitating the modification of the controller (e.g., to add, replace or remove components) and the serviceability of the controller (e.g., to replace worn out or malfunctioning components).

In accordance with one aspect of the invention, control input modules (e.g., thumbsticks, directional pads, etc.) can be readily coupled to and decoupled from a body of the video game controller to facilitate their installation and removal without the use of tools or the need to disassemble the controller body.

Optionally, control input modules can be interchangeable between different controllers (e.g., the same thumbstick input module can be removably installed on a video game controller for use with a Microsoft Xbox 360® console, a video game controller for use with a Sony P54® console, a video game controller for use with a Nintendo Switch™ console, etc.), facilitating the replacement of control input modules in different controllers.

In accordance with one aspect, a video game controller is provided. The video game controller comprises a controller body having a top surface and a bottom surface, one or more compartments accessible through the top surface of the controller body that are configured to removably receive one or more vibration motors. The controller also comprises a plurality of control inputs removably mounted on the controller body through the top surface to releasably connect with electronics disposed within the controller body below the top surface of the controller body. Each of the plurality of control inputs is operable to control one or more operations of the video game controller. The video game controller also comprises a face plate removably coupleable to the body over the top surface so that the plurality of control inputs extend through a plurality of openings in the face plate. One or more of the plurality of control inputs are removable and replaceable by decoupling the face plate from the controller body and decoupling said one or more of the control inputs from the controller body without disassembling the controller body.

In accordance with another aspect, a video game controller is provided. The video game controller comprises a controller body having a top surface and a bottom surface. The video game controller also comprises a plurality of control inputs comprising one or more thumbsticks, a directional pad and a plurality of buttons. The control inputs are removably mounted on the controller body through the top surface to releasably connect with electronics disposed within the controller body below the top surface of the controller body. Each of the plurality of control inputs is operable to control one or more operations of the video game controller. The video game controller also comprises a face plate removably coupleable to the controller body over the top surface. The face plate is magnetically coupleable to the controller body and has a plurality of openings through which the plurality of control inputs extend when the face plate is coupled to the controller body. The video game controller further comprises a paddle disposed on an underside of the controller body and movable relative to the bottom surface of the controller body. One or more of the plurality of control inputs are removable and replaceable by decoupling the face plate from the controller body and decoupling said one or more of the control inputs from the controller body without disassembling the controller body.

In accordance with another aspect, a video game controller kit is provided. The kit comprises a video game controller comprising a controller body having a top surface and a bottom surface. One or more compartments accessible through the top surface of the controller body that are configured to removably receive one or more vibration motors. The video game controller comprises a plurality of control inputs comprising one or more interchangeable thumbsticks, a directional pad and a plurality of buttons, the control inputs removably mounted on the controller body through the top surface to releasably connect with electronics disposed within the controller body below the top surface of the controller body. Each of the plurality of control inputs operable to control one or more operations of the video game controller. The video game controller also comprises a face plate removably coupleable to the controller body over the top surface and having a plurality of openings through which the plurality of control inputs extend when the face place is coupled to the controller body. The video game controller also comprises a paddle disposed on an underside of the controller body and movable relative to the bottom surface of the controller body. The kit also comprises a plurality of replacement thumbsticks configured to replace the one or more interchangeable thumbsticks, at least one of the plurality of replacement thumbsticks having a different height or shape. One or more of the plurality of control inputs are removable and replaceable by decoupling the face plate from the controller body and decoupling said one or more of the control inputs from the controller body without disassembling the controller body.

DETAILED DESCRIPTION

Figure 1:
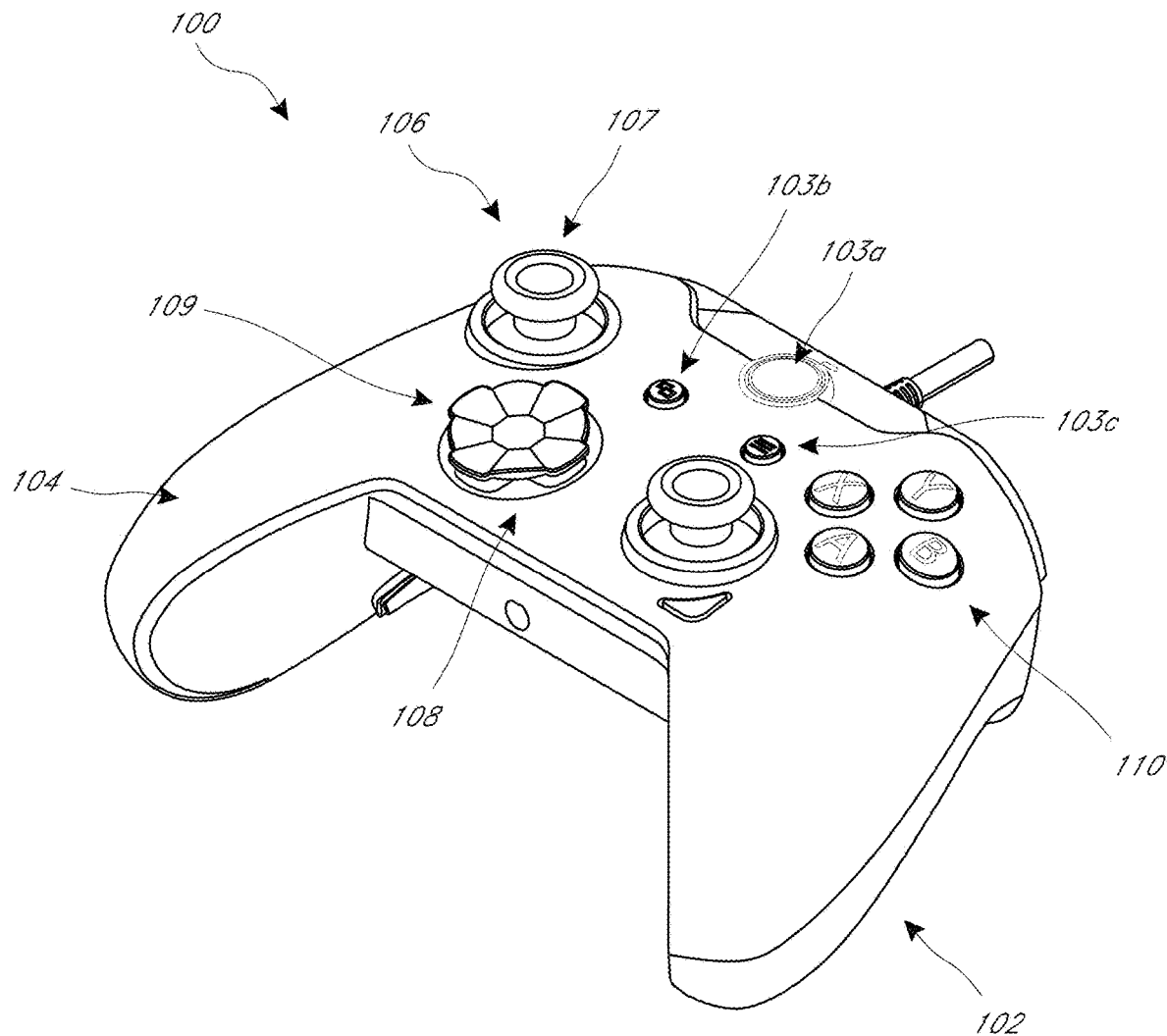
FIG. 1 is a perspective view of one embodiment of a video game controller.

Video game controllers can have a variety of control inputs, such as thumbsticks, directional pads, buttons (e.g., A/B/X/Y buttons), paddles, triggers, etc. to effect different functionalities while playing a video game. Each control input can have a structural interface (e.g., housing with contact surface) that a user engages and an underlying sensor module component that can be operatively (e.g., mechanically, electrically, etc.) coupled to the controller and transmits signals corresponding to the actuation of the control unit by the user to the video game console to which the controller is connected. Over time, one or both of the structural interface and the underlying sensor module component of the control inputs may malfunction or wear out. For example, with prolonged use, the structural features of control units (e.g., contact pads of thumbsticks) may wear out, become damaged, erode, or otherwise malfunction, impeding or making it difficult to utilize by a user to effectively play a video game with the controller. The embodiments described below describe video game controllers with features that advantageously facilitate the servicing and/or customization of video game controllers without requiring the disassembly of the entire controller or the use of tools. For example, such modular components (e.g., thumbsticks with different heights and/or shapes, directional pads with different shapes, sizes and/or styles, interchangeable buttons) advantageously allow the user to enhance their game playing experience by customizing the controller (e.g., based on their particular preference).

FIGS. 1-8 show one embodiment of a video game controller 100 (the "controller"). In the illustrated embodiment, the controller 100 can have a body 102 and a face plate 104. Advantageously, the face plate 104 can readily be decoupled from the body 102 (e.g., without the use of tools) to expose one or more components in the body 102, as further discussed below. The removable face plate 104 facilitates the customization of the controller 100 (e.g., by using face plates with different ornamental designs). The controller 100 can have a plurality of control inputs that a user can actuate to effect different functionalities while playing a video game, such as one or more of the following: thumbsticks 106, directional pads 108, and buttons 110, paddles 140, triggers 101, and related circuitry and componentry. In the illustrated embodiment, the controller 110 has two triggers 101, two thumbsticks 106, one directional pad 108, four buttons 110 (e.g., A, B, X, Y buttons), a guide button 103a and back/start buttons 103b, 103c, and be adapted for use with an Xbox® video game console. Though the illustrated embodiment, shows one trigger 101 (left trigger in FIG. 1A) in an extended position and one trigger 101 (right trigger in FIG. 1A) in a depressed position, one of skill in the art will recognize that both triggers 101 can optionally be depressed at the same time, or be in the extended at the same time (e.g., when not actuated by a user).

The controller 100 can optionally be fixedly connected to a cable that can connect to a video game console (e.g., via a USB type connector, such as a USB type A connector). In other embodiments, the controller 100 can have one or more female USB connectors (e.g., one or more of USB type A, USB type B, or USB type C connectors) that can receive a cable to connect to a video game console. In some embodiments, the controller 100 can have multiple female USB connectors to receive different types of cables to connect to a video game console.

Figure 1A:
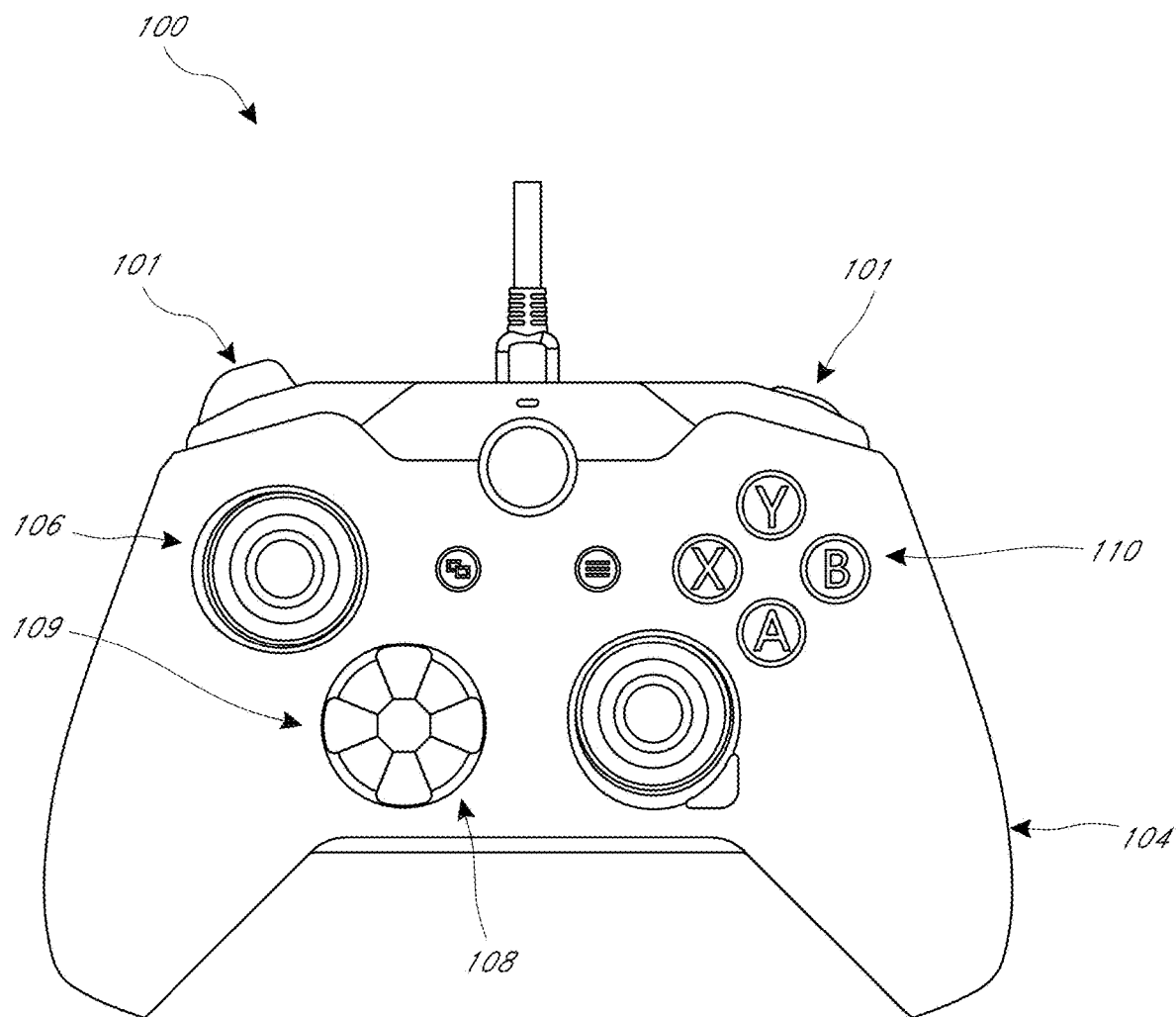
FIG. 1A is a top view of the video game controller of FIG. 1.
Figure 1B:
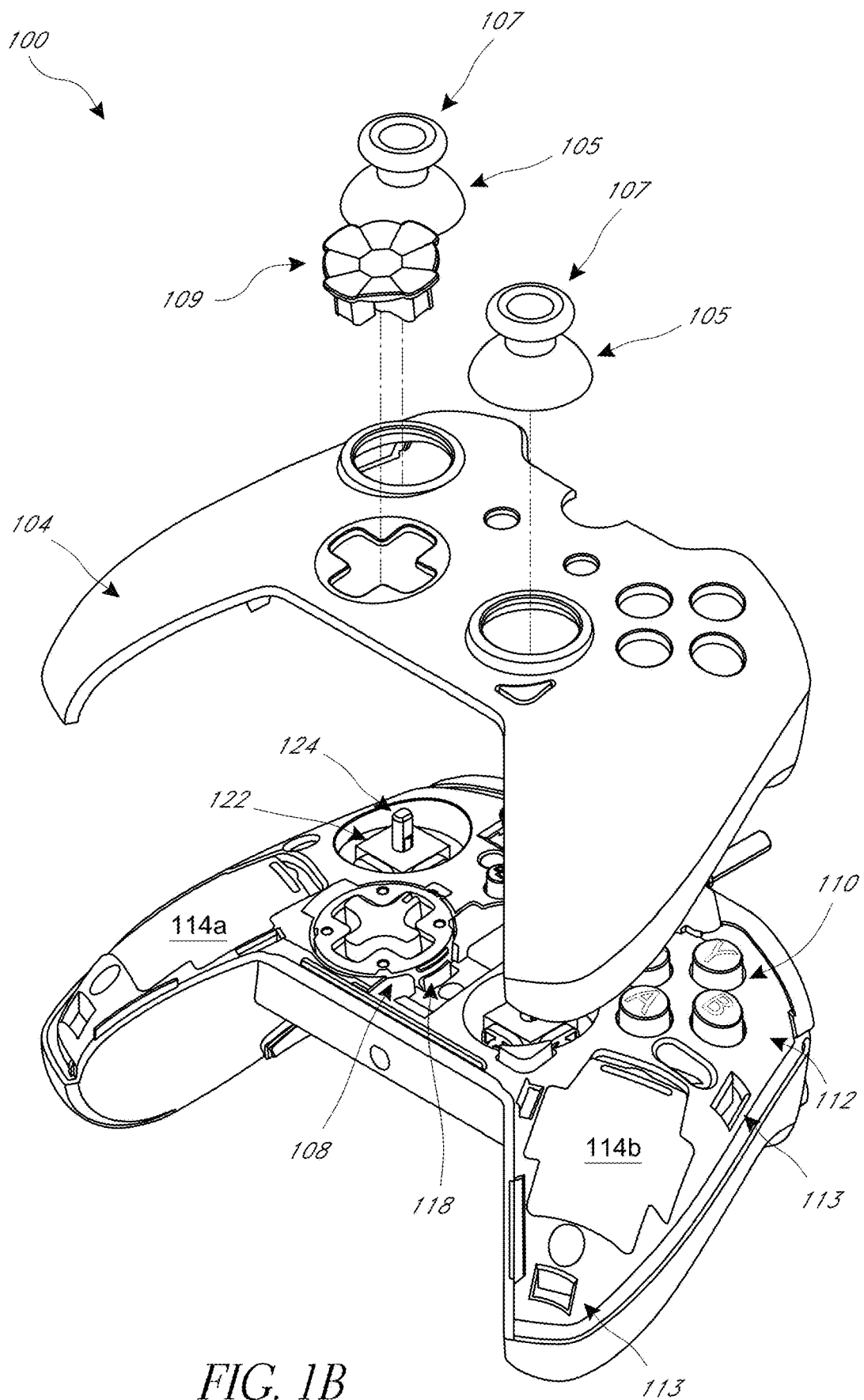
FIG. 1B is a perspective exploded view of the controller in FIG. 1.
Figure 1C:
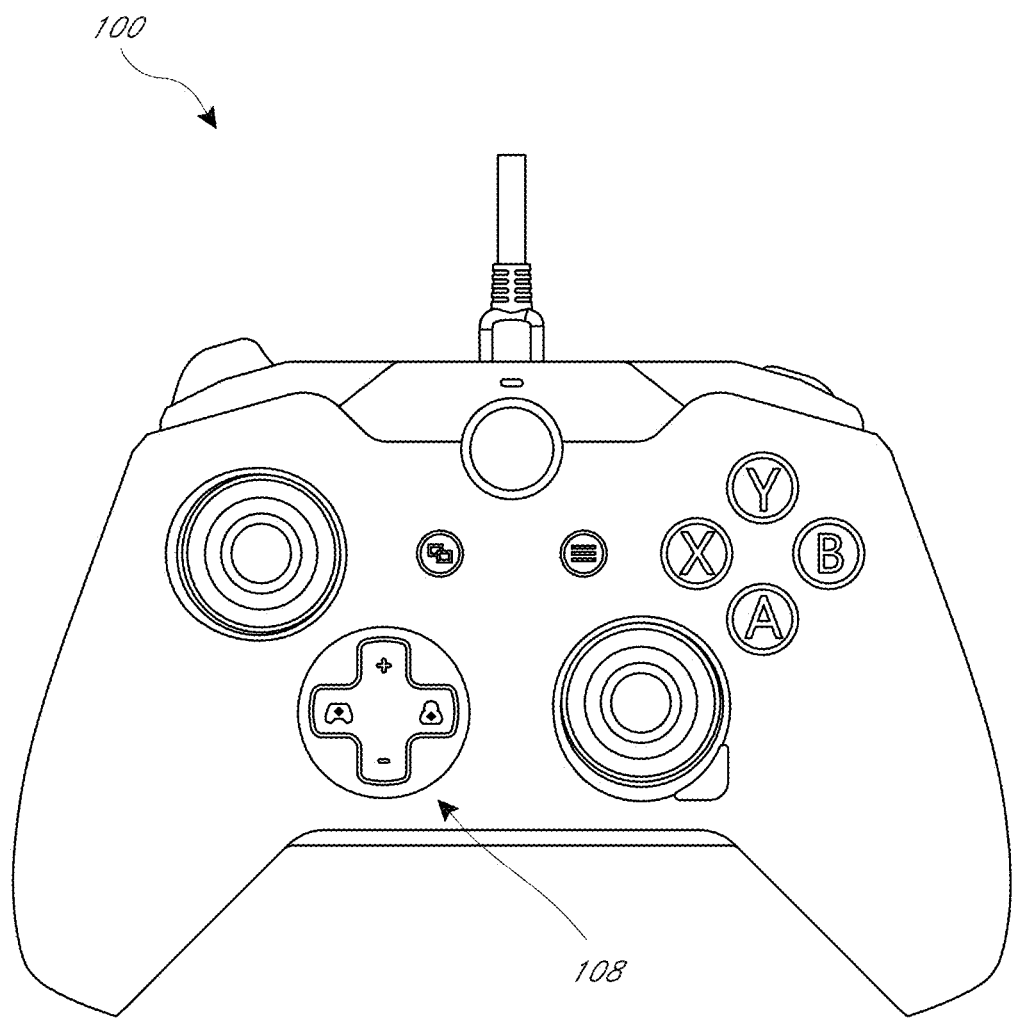
FIG. 1C is a top view of the video game controller of FIG. 1 with the directional pad cover removed.

As best shown in FIGS. 1, 1A-1B, the directional pad control input 108 can optionally have a cover 109 that can removably couple to the underlying directional pad unit 111 (see FIG. 1C where the cover 109 has been removed). The cover 109 can mechanically couple to the directional pad unit 111. The gamer can couple different types of covers 109 to the directional pad unit 111 to customize the feel of the directional pad control input 108. Similarly, the contact pad 107 of the thumbstick control input 106 can optionally be interchangeable, allowing the gamer to customize the feel of the thumbstick control input 106 (e.g., changing the surface shape of the contact pad 107, changing the surface material of the contact pad 107, changing the height of the thumbstick control input 106, etc.).

Figure 2:
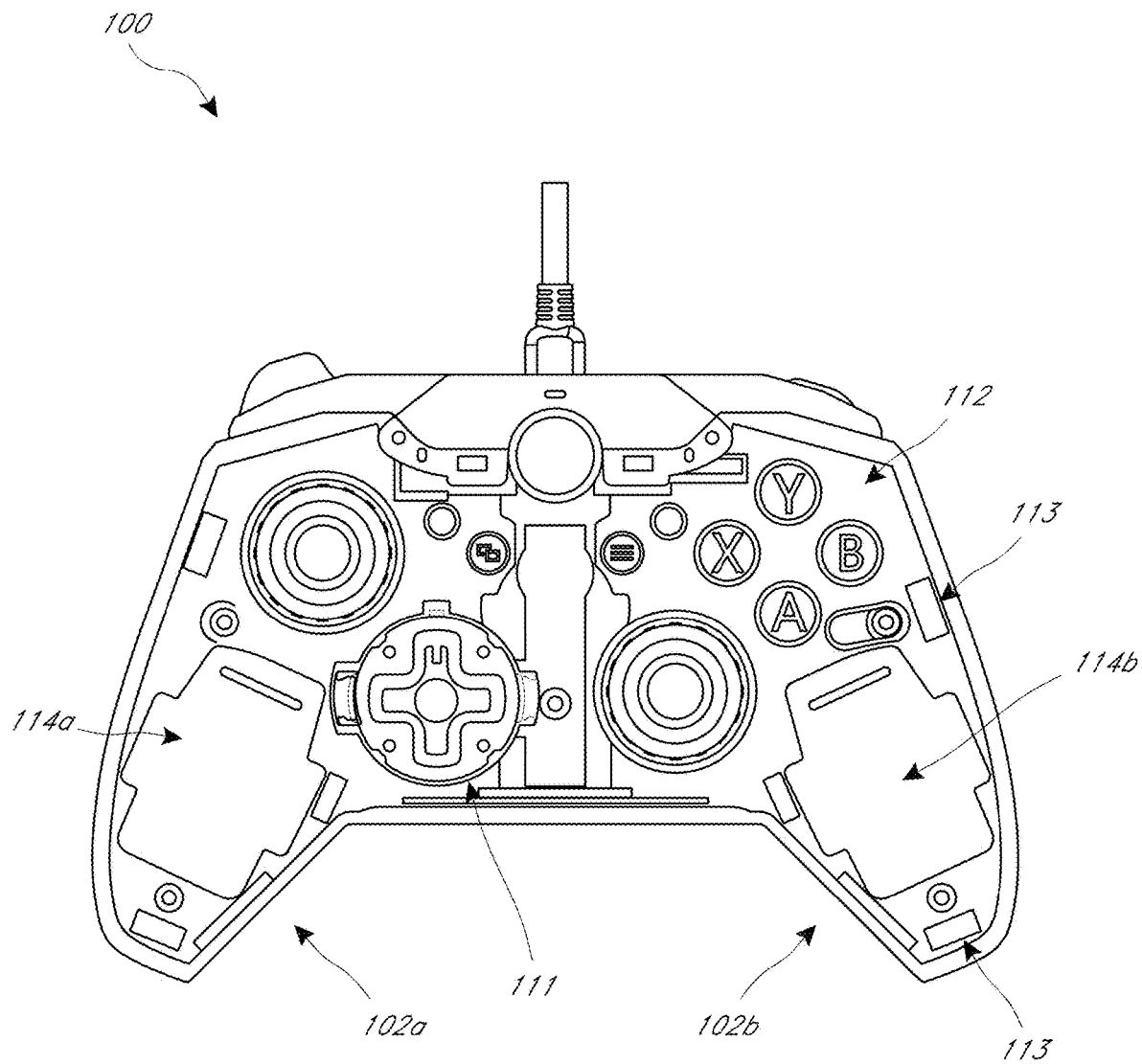
FIG. 2 is a top view of the video game controller of FIG. 1 with the face plate removed.

FIG. 2 shows the controller 100 with the face plate 104 removed, exposing a top surface 112 of the body 102 through which the control inputs are mounted. The face plate 104 can be removably coupled to the body 102 and can be readily removable (e.g., with the user's fingers, without the use of tools), which advantageously facilitates access to the components (e.g., control inputs 106, 108, 110) without having to disassemble the controller 100. The face plate 104 can have openings through which the control inputs 106, 108, 110 extend for the user to contact. The face plate 104 can optionally be mechanically coupled to the body 102. For example, the face plate 104 can clip onto the body 102 (e.g., the face plate 104 can have one or more resilient clips that extend into slots 113 in the surface 112). In another embodiment, the face plate 104 can magnetically couple to the body 102. For example, the underside of the face plate 104 can have one or more metal portions that engage magnets (not shown) disposed on the top surface 112 of the body 102. Alternatively, the underside of the face plate 104 can have one or more magnets that engage one or more metal portions disposed on the top surface 112 of the body 102.

Figure 3:
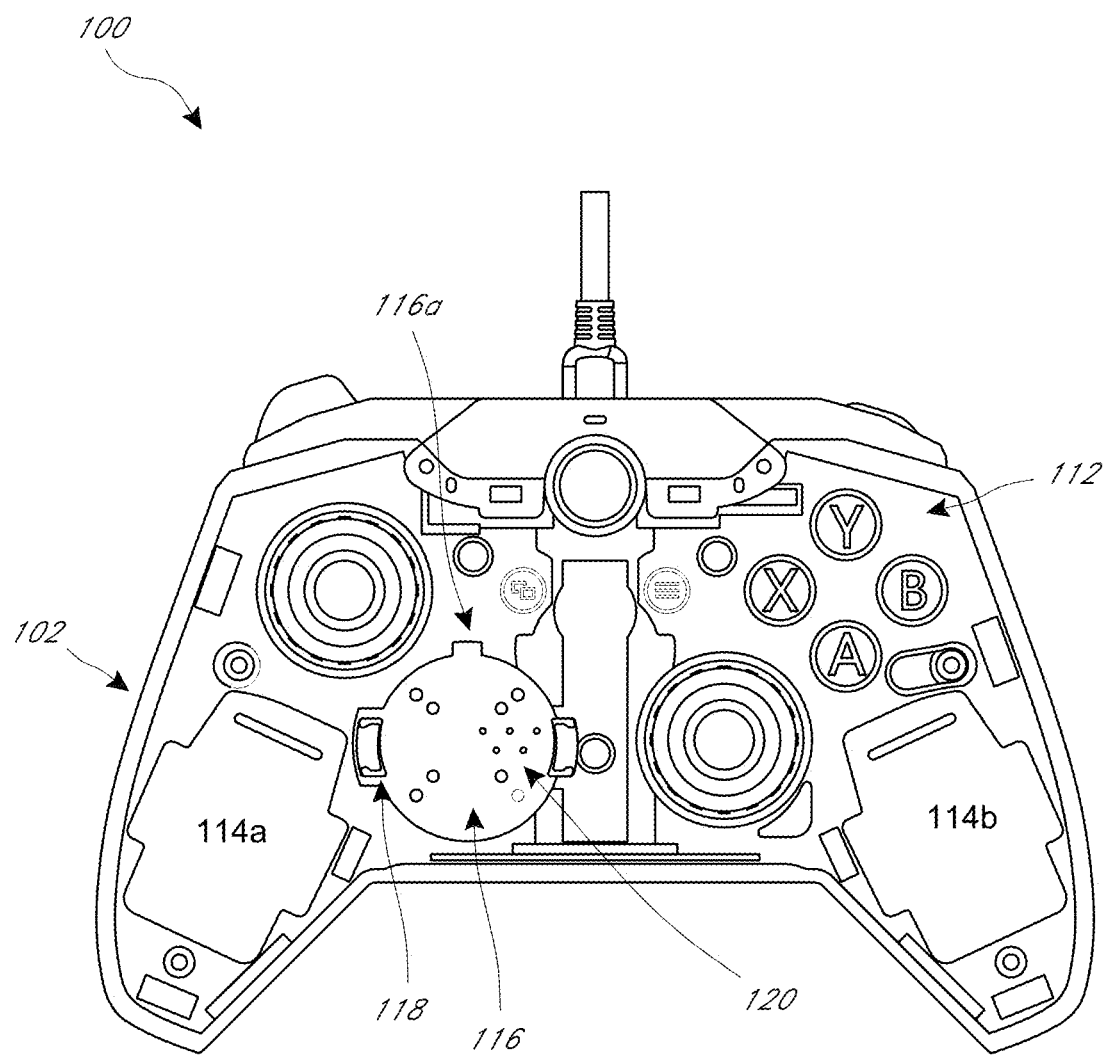
FIG. 3 is a top view of the video game controller of FIG. 2 with the directional pad input control module removed.
Figure 4:
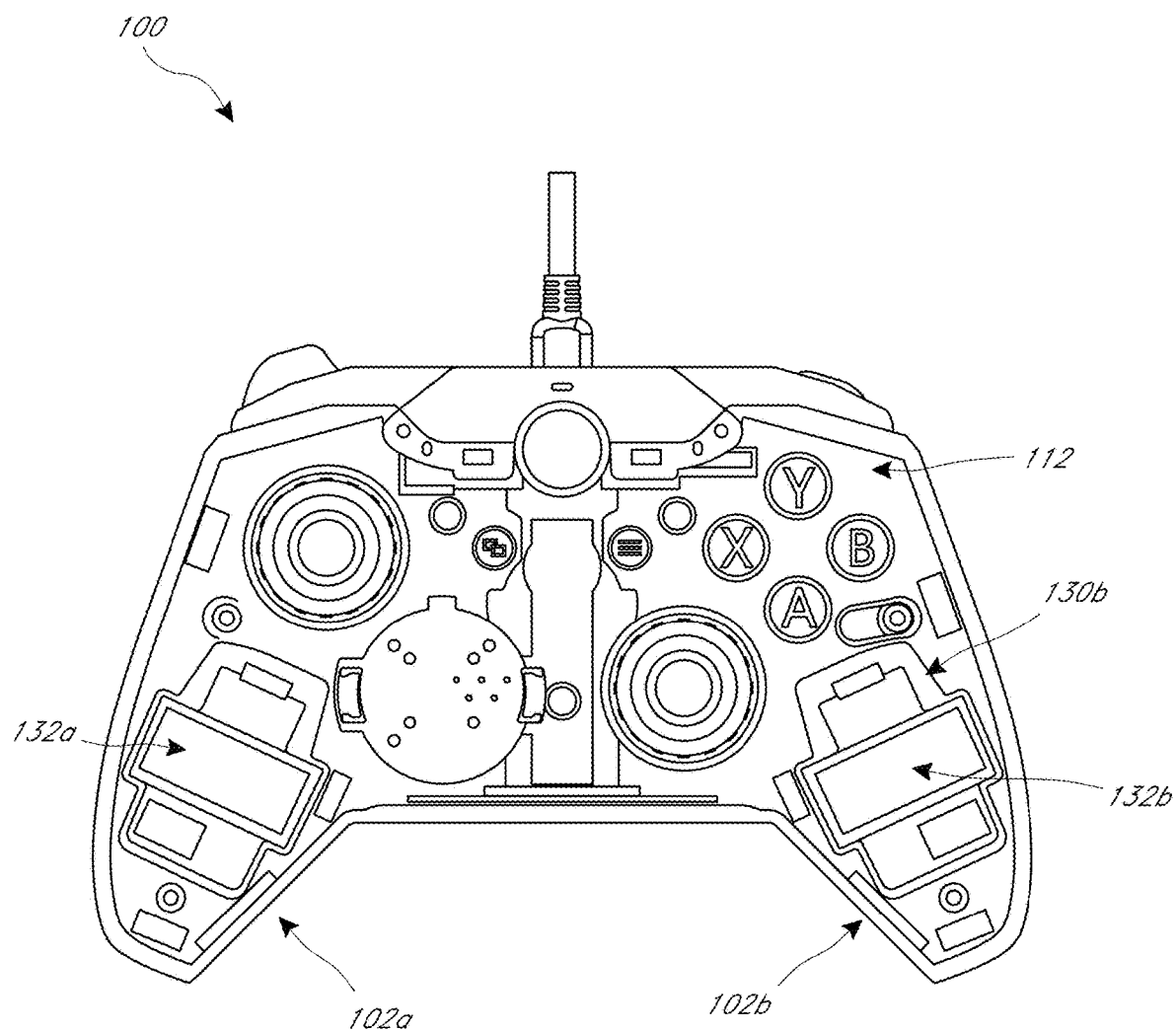
FIG. 4 is a top view of the video game controller of FIG. 3 with side covers removed.

With reference to FIGS. 2-4, the top surface 112 of the body can optionally include one or more removable covers 114*a*, 114*b* that cover one or more optional compartments 130*a*, 130*b* in the body 102 (e.g., in handles 102*a*, 102*b* of the body 102). As shown in FIG. 4, the one or more compartments 130*a*, 130*b* can optionally removably house vibration motors 132*a*, 132*b* (e.g., rumble motors, eccentric rotating mass vibration motors) that can be selectively actuated by a signal communicated to the controller 100 from the video game console to provide vibration feedback to the body 102 (e.g., provide vibration feedback to one or both of the handles 102*a*, 102*b* of the body 102). Advantageously, the removable face plate 104 and optional removable covers 114*a*, 114*b* facilitate the easy removal and replacement of the one or more vibration rumble motors 132*a*, 132*b*, such as to service existing motors or replace malfunctioning motors. Moreover, since only the face plate 104 and the optional covers 114*a*, 114*b* need to be removed to replace the motors 132*a*, 132*b*, the motors 132*a*, 132*b* can be easily and quickly replaced, without having to disassemble the body 102 of the controller 100 (e.g., without removing the top surface 112 from the rest of the body 102). Additionally, the removable face plate 104 and optional covers 114*a*, 114*b* allow the modification or customization of the controller 110. For example, motors with different strengths or sizes can be installed. Alternatively, the motors 132*a*, 132*b* can be removed if haptic feedback provided by the vibration motors is not desired or required by the video game system being used. Optionally, the one or more compartments 130*a*, 130*b* can instead house one or more weights to increase the weight of the controller 100 in the user's hands, as preferred by the user. In another embodiment, the one or more compartments 130*a*, 130*b* can optionally be empty (e.g., not have any component disposed in them), for example if the user prefers a lighter controller 100. In another embodiment, the covers 114*a*, 114*b* are excluded, so that compartments 130*a*, 130*b* can optionally house vibration motor 132*a*, 132*b*, one or more weights, etc. In another embodiment, the compartments are excluded (see FIG. 18).

FIG. 3 shows the controller 100 with the face plate 104 removed to expose the top surface 112 of the body 102. In the illustrated embodiment, the directional pad unit 111 has been removed, exposing the compartment 116 in the body 102 that removably receives the directional pad unit 111 (also shown in FIG. 6). The directional pad unit 111 can removably couple to the body 102 with a coupling mechanism, optionally a mechanical coupling mechanism.

Optionally, the directional pad unit 111 can removably couple to the body 102 via one or more clips 118 in the compartment 116 that releasably engage corresponding members (e.g., tabs, ridges, etc.) on the directional pat unit 111. The directional pad unit 111 can optionally be aligned with features in the compartment 116 (e.g., alignment slot 116*a*), and advanced linearly into the compartment 116 until the directional pad unit 111 fixedly couples to the body 102 (e.g., clicks or snaps into place).

Alternative mechanisms for coupling the directional pad unit 111 in the compartment 116, such as a slot and key mechanism, a twist-lock mechanism, a threaded mechanism, can be used. In still another embodiment, the coupling mechanism can be a magnetic coupling mechanism, where one or more magnets are disposed in the compartment 116 or the directional pad unit 111 to engage one or more metal components in the directional pad unit 111 of the compartment 116. One or more contacts 120 (e.g., pins) can extend into the compartment 116 to effect an electrical contact between the directional pad unit 111 and the electronics (e.g., printed circuit board) housed in the body 102 under the top surface 112 when the directional pad unit 111 is installed in the compartment 116.

Advantageously, the removable face plate 104 and coupling mechanism between the directional pad unit 111 and the compartment 116 (e.g., the clips 118) facilitate the removal and replacement of the directional pad unit 111, such as to service the directional pad unit 111 or replace a malfunctioning unit 111. Moreover, since only the face plate 104 needs to be removed to replace the directional pad unit 111, the directional pad unit 111 can be easily and quickly replaced, without having to disassemble the body 102 of the controller 100 (e.g., without removing the top surface 112 from the rest of the body 102).

Figure 5:
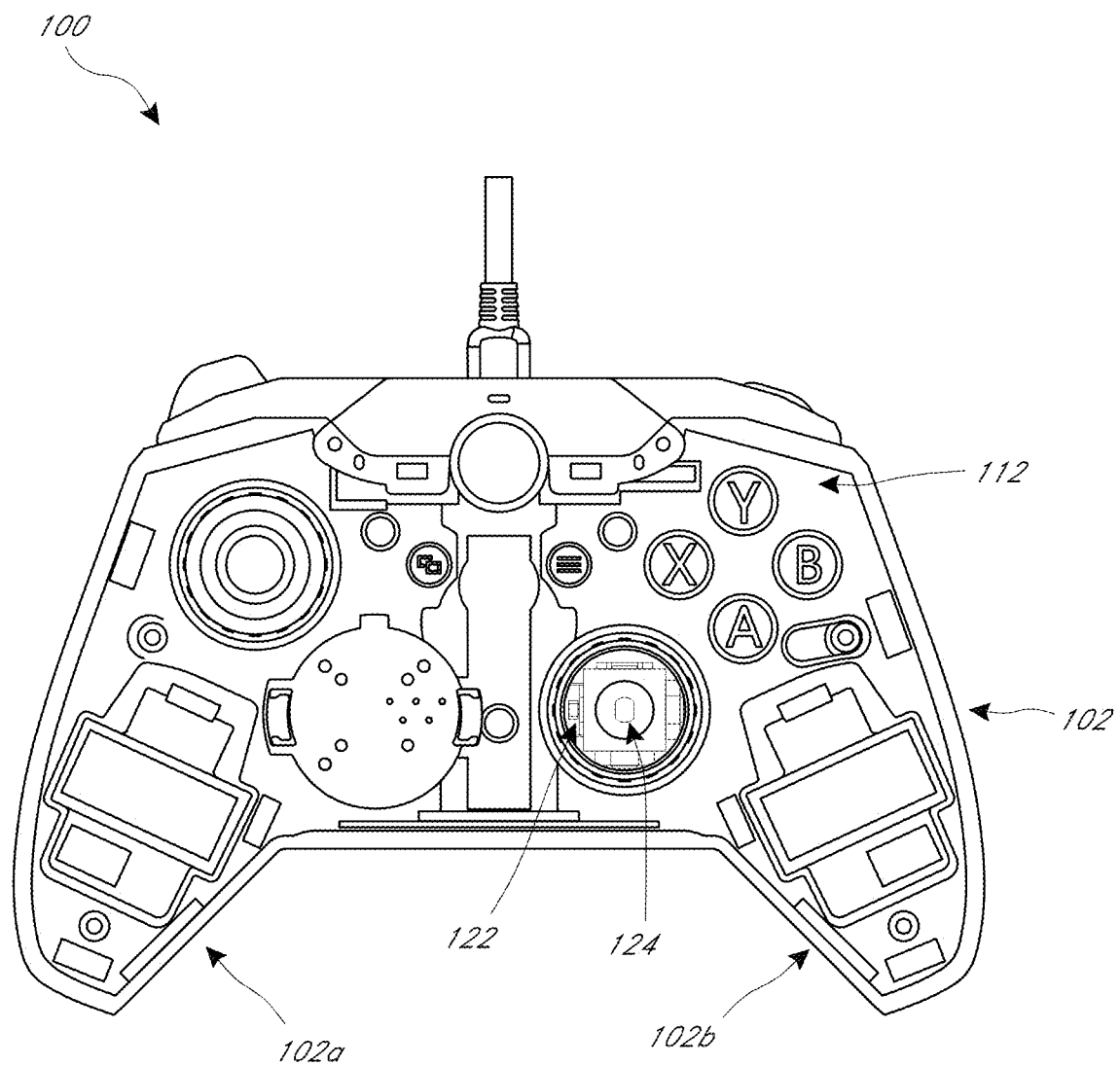
FIG. 5 is a top view of the video game controller of FIG. 4 with a thumbstick input control interface.
Figure 6:
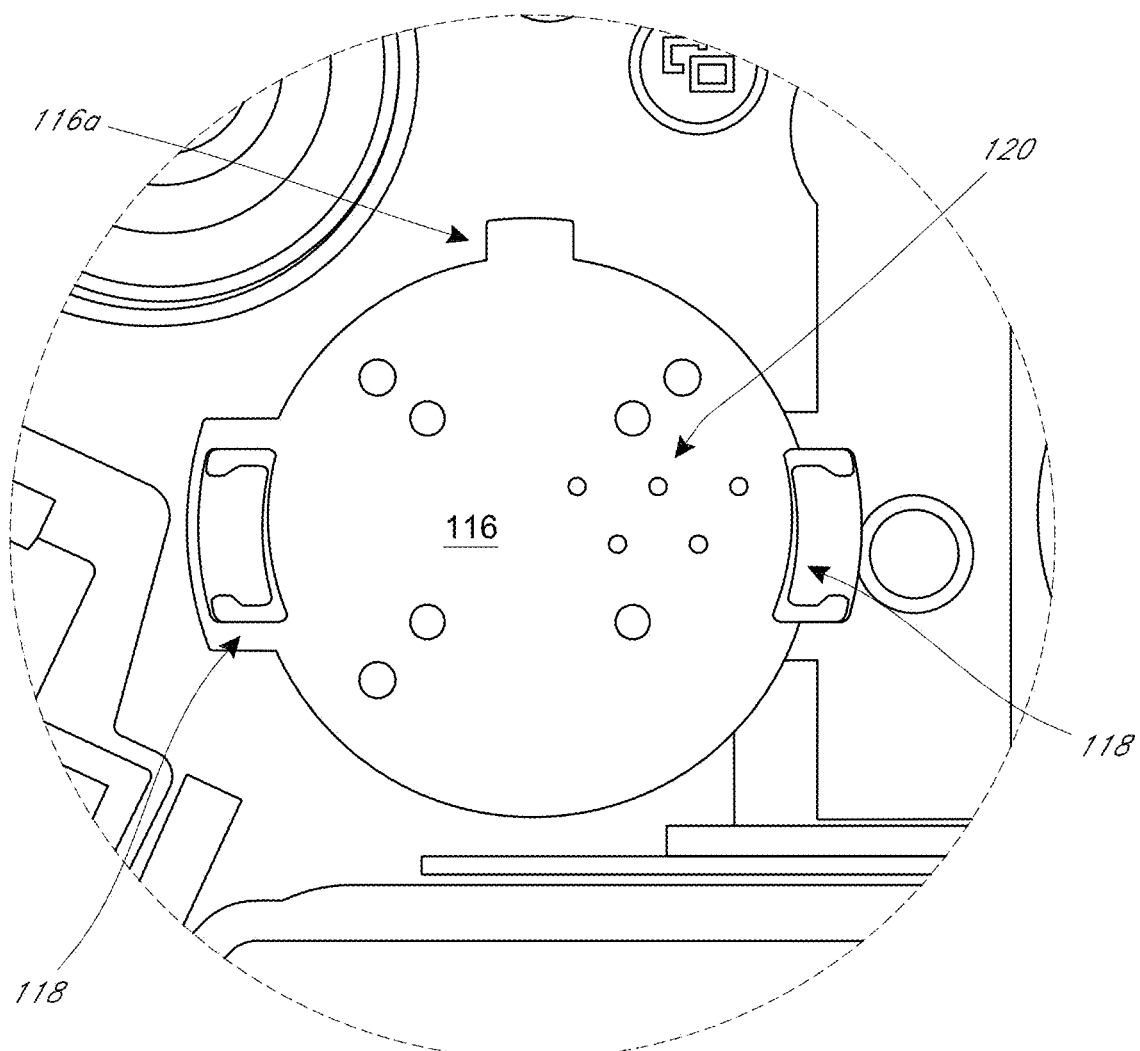
FIG. 6 is an enlarged view of a recessed slot in FIG. 3 that removably receives the directional pad input control module.

FIG. 5 shows the controller 100 with the face plate 104 removed to expose the top surface 112 of the body 102. In the illustrated embodiment, a mechanical cover 105 of the thumbstick control input 106 has been removed, exposing the underlying thumbstick unit 122 and post 124. The mechanical cover 105 can have a channel or bore (not shown) that slides over and engages (e.g., frictionally engages) the post 124. Advantageously, the removable face plate 104 and mechanical cover 105 facilitate the servicing and/or modification of the thumbstick control input 106. For example, different covers 105 can be installed on the underlying thumbstick unit 122 (e.g., having different shapes or materials for the contact pads 107, different heights for the thumbstick, etc.). Additionally, the underlying thumbstick unit 122 can be serviced. Moreover, since only the face plate 104 needs to be removed to replace the mechanical cover 105 for the thumbstick control unit 106, the cover 105 can be easily and quickly replaced, without having to disassemble the body 102 of the controller 100 (e.g., without removing the top surface 112 from the rest of the body 102).

Figure 7:
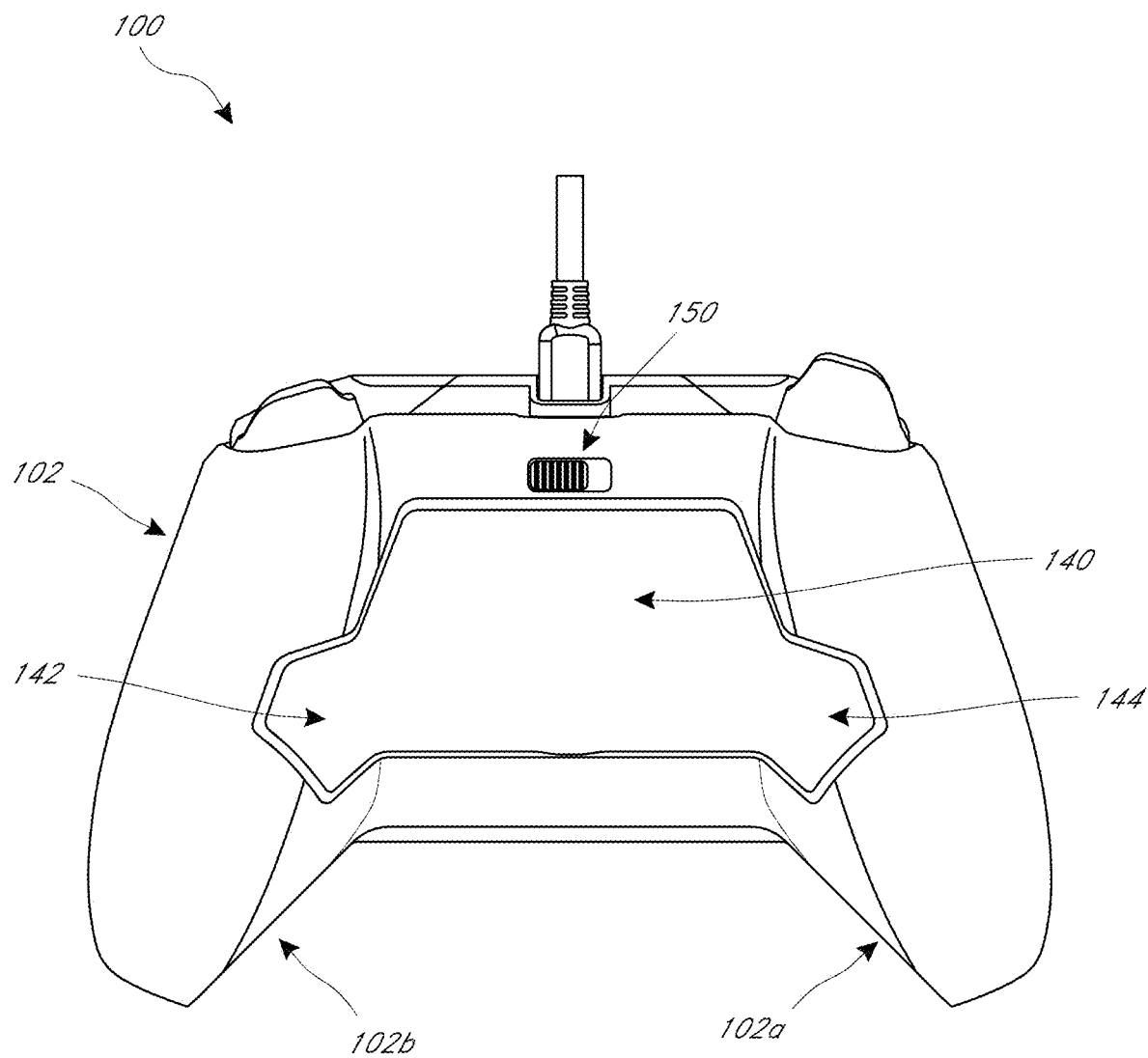
FIG. 7 is a bottom view of the video game controller of FIG. 1.
Figure 8:
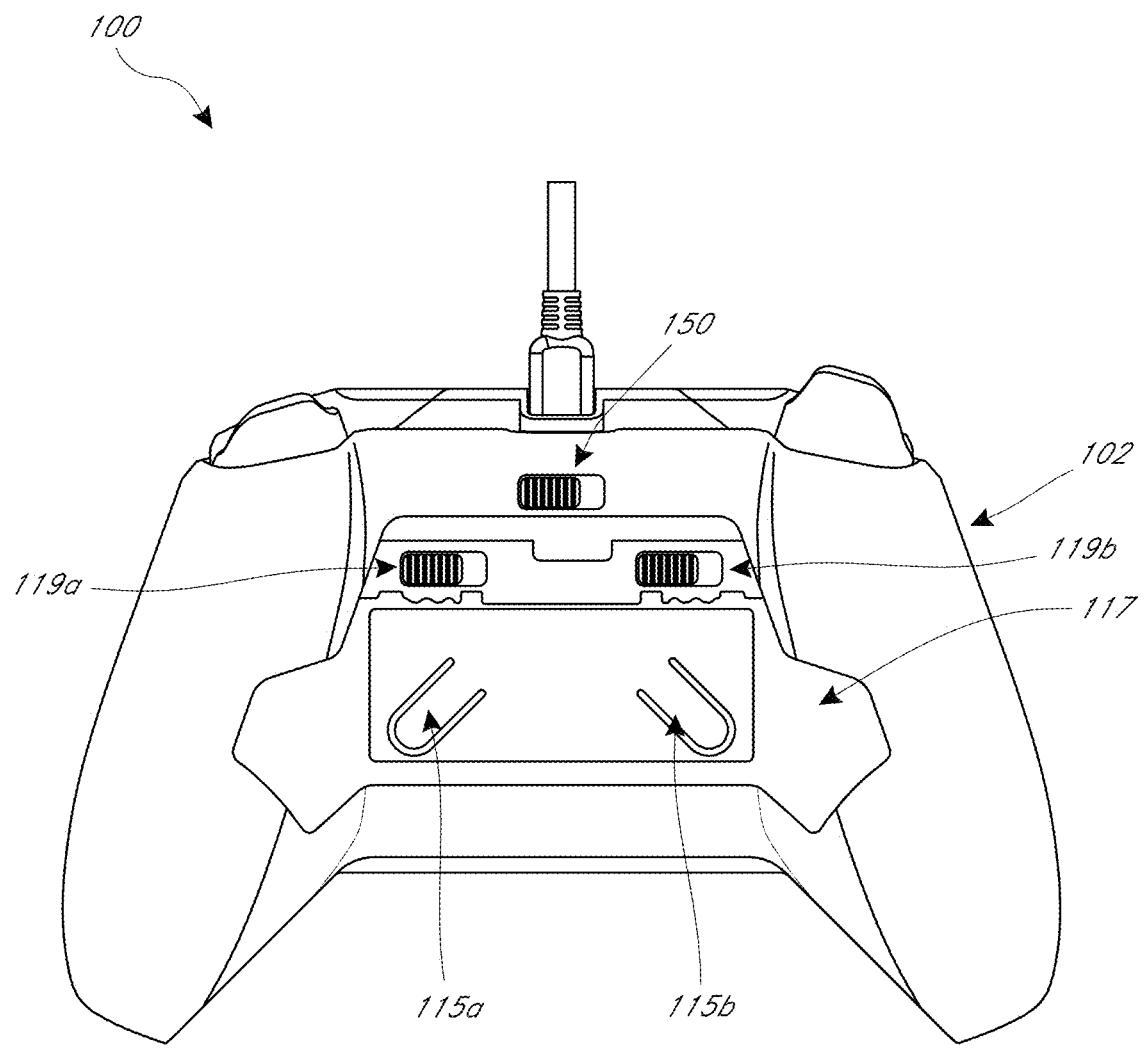
FIG. 8 is a bottom view of the video game controller of FIG. 1 with a paddle plate removed.
Figure 9:
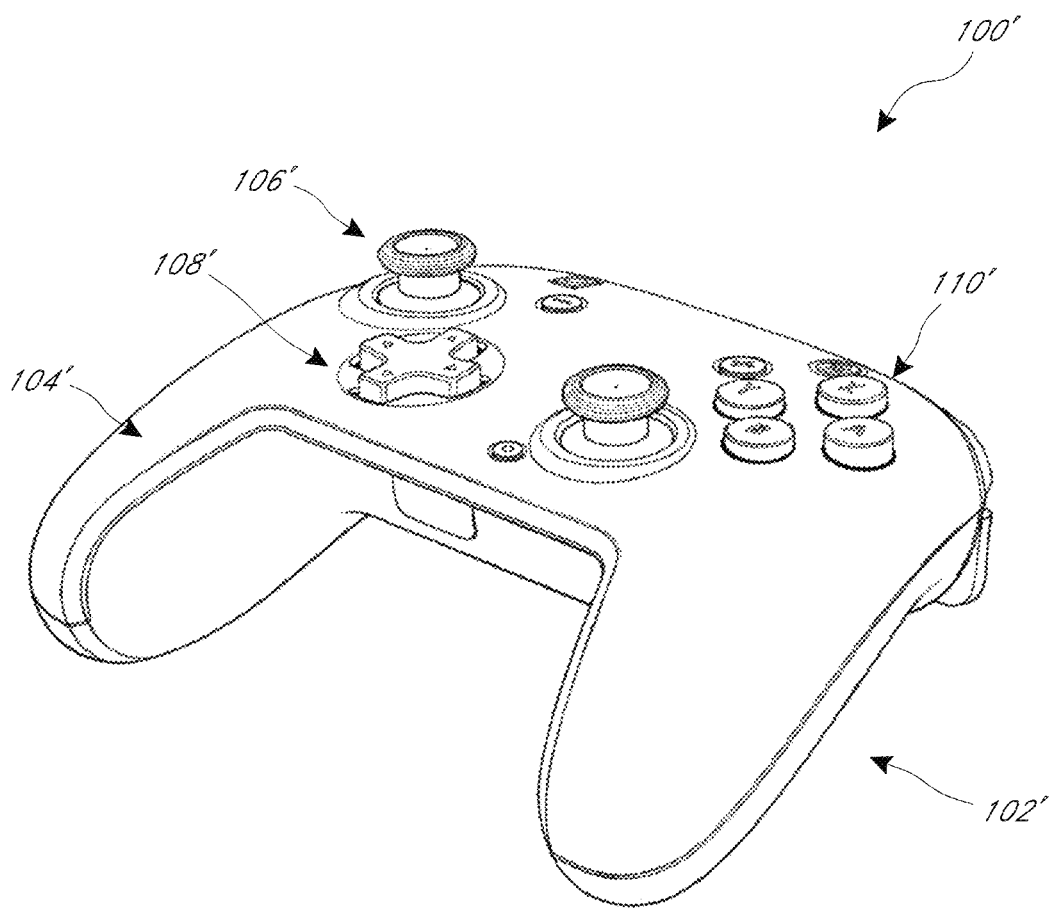
FIG. 9 is a top perspective view of another embodiment of a video game controller.
Figure 10:
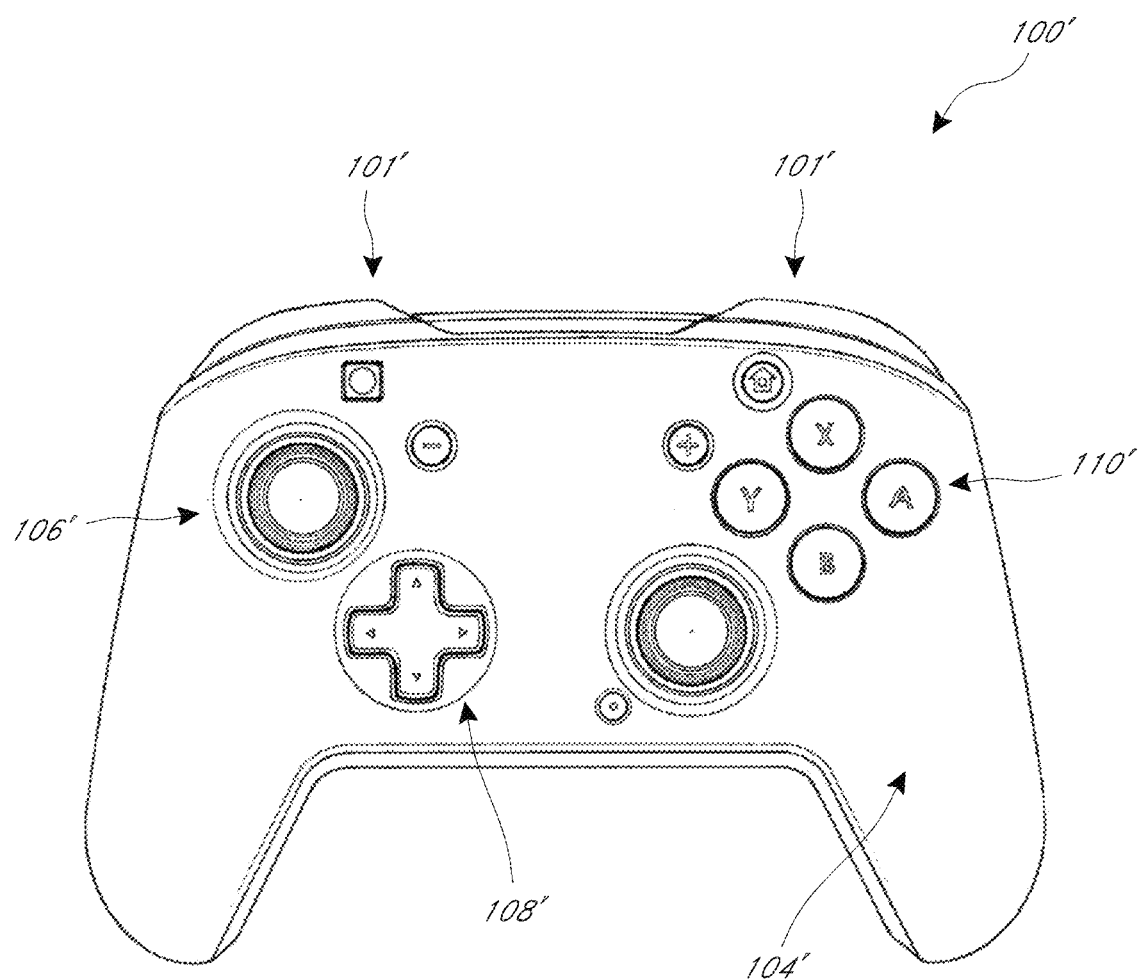
FIG. 10 is a top view of the video game controller of FIG. 9.

FIG. 7 shows a back side of the controller 100 with a paddle unit 140 that can be engaged by the user's fingers to generate one or more signals that can be communicated to the video game console to effect a command in the video game. The paddle unit 140 can optionally be a single piece. The paddle unit 140 can optionally have a pair of wings 142, 144, where the user can generate a command signal by pressing one or both of the pair of wings 142, 144. A locking switch 150 on the body 102 can removably engage (e.g., lock) a member (e.g., lever) on an underside of the paddle unit 140. The switch 150 can be actuated (e.g., slid) to unlock the paddle unit 140 allowing it to be removed, thereby exposing a bottom surface 117 of the body 102 that is disposed under the paddle unit 140. One or more levers 115*a*, 115*b* can be disposed on the bottom surface 117 (e.g., extending at an angle relative to the central axis of the controller 100). The paddle unit 140 can engage the levers 115*a*, 115*b* when pressed (e.g., when one of both of the wings 142, 144 are pressed), which can actuate one or more switches disposed within the body 102 under the bottom surface 117. The paddle unit 140 can advantageously be easily replaced (e.g., with paddle units having different ornamental designs, materials or shapes), thereby further allowing for the customization of the controller 100. Moreover, the ease in removing the paddle unit 140 allows access to the bottom of the controller 100 to facilitate servicing of one or more components on the underside of the controller 100, such as the switches that are engaged by the levers 115*a*, 115*b*.

FIGS. 9-15 show another embodiment of a video game controller 100' (the "controller"). The controller 100' is constructed in a similar manner as the controller 100 shown in FIGS. 1-8, except as noted below. Therefore, the reference numerals used to designate the various components of the controller 100' are identical to those used for identifying the corresponding components of the controller 100 in FIGS. 1-8, except that a "'" has been added to the reference numerals.

The controller 100' can have a body 102' and a face plate 104'. Advantageously, the face plate 104' can readily be decoupled from the body 102' (e.g., without the use of tools) to expose one or more components in the body 102', as further discussed below. The removable face plate 104' facilitates the customization of the controller 100' (e.g., by using face plates with different ornamental designs). The controller 100' can have a plurality of control inputs, such as one or more of the following: thumbsticks 106', directional pads 108', and buttons 110'. In the illustrated embodiment, the controller 110' has two thumbsticks 106', one directional pad 108' and a plurality of buttons 110' and be adapted for use with an Nintendo® video game console.

Figure 13:
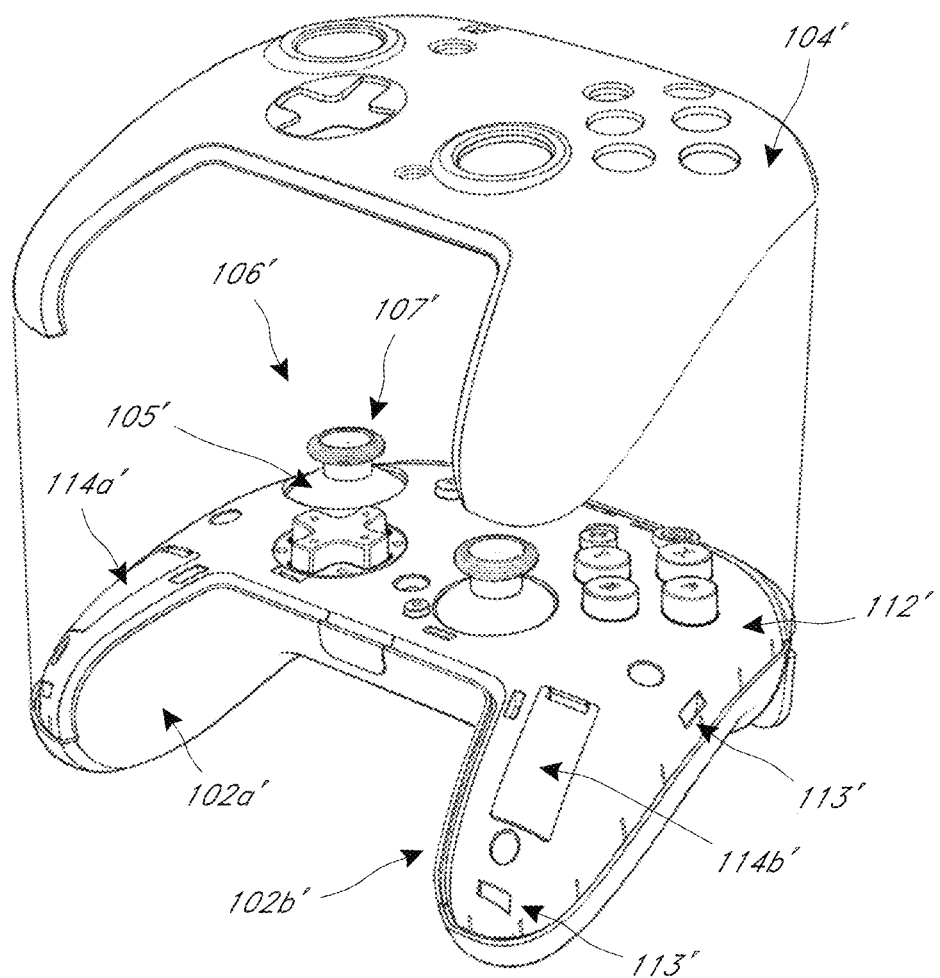
FIG. 13 is a top perspective view of the video game controller of video game controller of FIG. 9 with the face plate removed.
Figure 14:
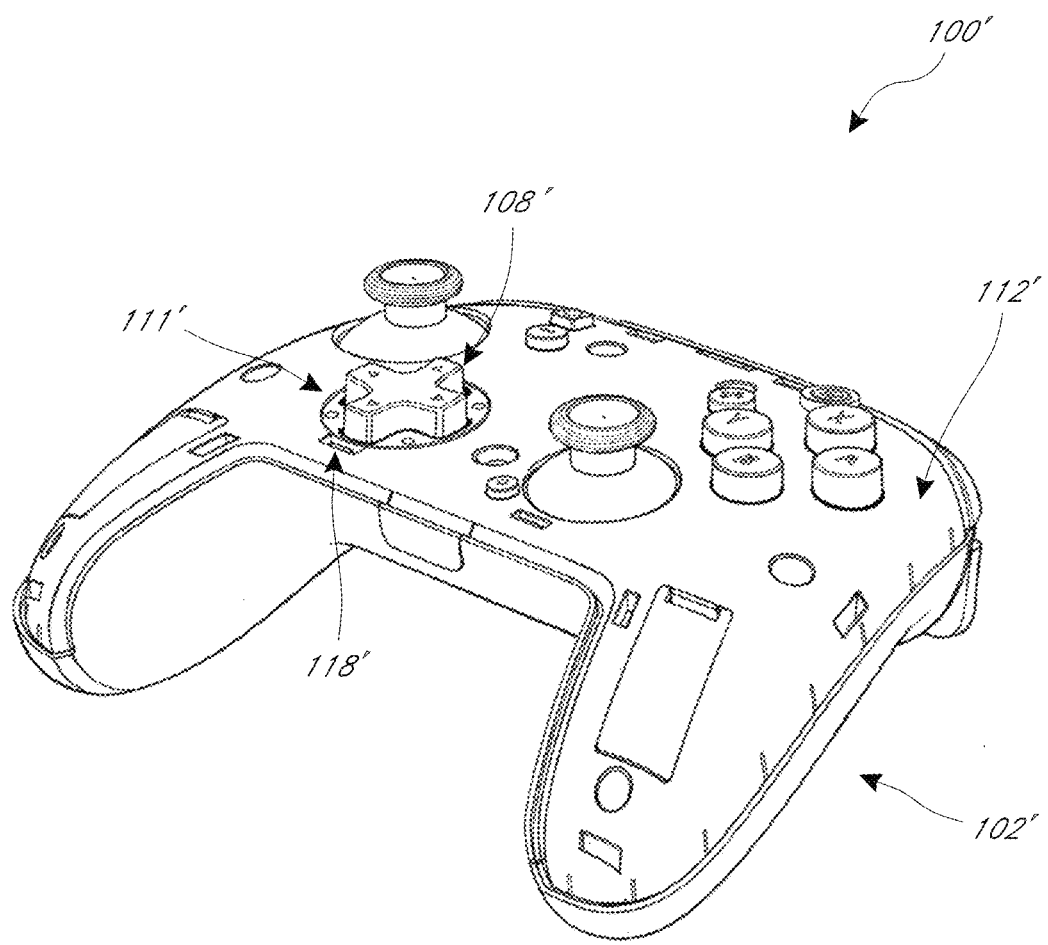
FIG. 14 is a top perspective view of the video game controller of FIG. 9 without the face plate.
Figure 15:
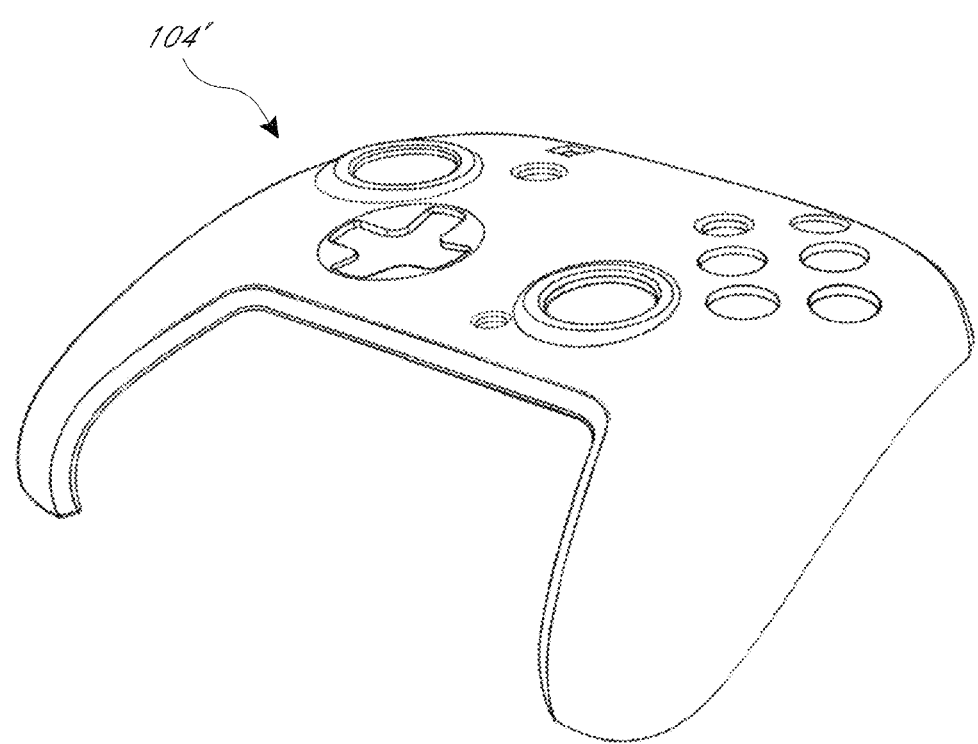
FIG. 15 is a top perspective view of the face plate of the video game controller of FIG. 9.
Figure 16:
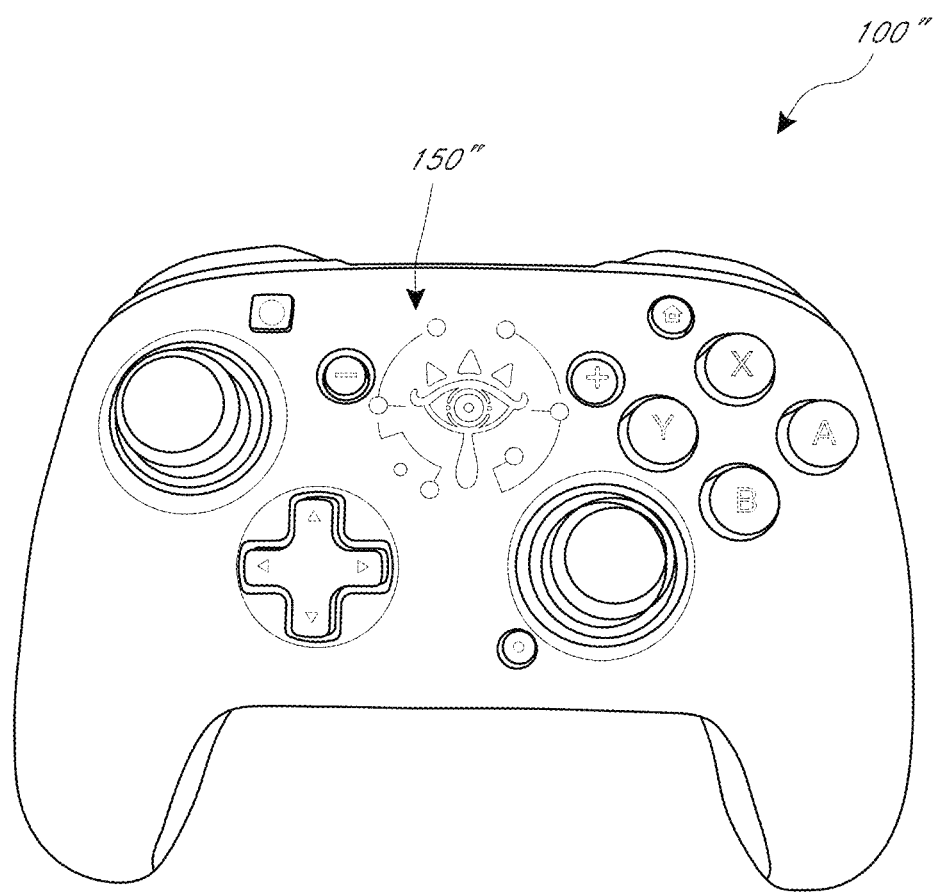
FIG. 16 is a top view of another embodiment of a video game controller.

FIGS. 13-14 shows the controller 100' with the face plate 104' removed, exposing a top surface 112' of the body 102' through which the control inputs are mounted. The face plate 104' can be removably coupled to the body 102' and can be readily removable (e.g., with the user's fingers, without the use of tools), which advantageously facilitates access to the components (e.g., control inputs 106', 108', 110') without having to disassemble the controller 100'. The face plate 104' can have openings (see FIGS. 13, 15) through which the control inputs 106', 108', 110' extend for the user to contact. The face plate 104' can optionally be mechanically coupled to the body 102'. For example, the face plate 104' can clip onto the body 102' (e.g., the face plate 104' can have one or more resilient clips that extend into slots 113' in the surface 112'). In another embodiment, the face plate 104' can magnetically couple to the body 102'. For example, the underside of the face plate 104' can have one or more metal portions that engage magnets (not shown) disposed on the top surface 112' of the body 102'. Alternatively, the underside of the face plate 104' can have one or more magnets that engage one or more metal portions disposed on the top surface 112' of the body 102'.

With reference to FIGS. 13-14, the top surface 112' of the body can optionally include one or more removable covers 114*a'*, 114*b'* that cover one or more compartments in the body 102' (e.g., compartments similar to compartments 130*a*, 130*b* in handles 102*a'*, 102*b'* of the body 102'). Advantageously, the removable face plate 104' and optional removable covers 114*a'*, 114*b'*, where present, facilitate the quick and easy removal and replacement of the one or more components in said compartments, without having to disassemble the body 102' of the controller 100' (e.g., without removing the top surface 112' from the rest of the body 102'). Additionally, the removable face plate 104' and optional covers 114*a'*, 114*b'* allow the modification or customization of the controller 110'. For example, the one or more compartments can optionally house vibration motors or one or more weights to increase the weight of the controller 100' in the user's hands, as preferred by the user. In another embodiment, the one or more compartments can optionally be empty (e.g., not have any component disposed in them), for example if the user prefers a lighter controller 100'. In another embodiment, the covers 114*a'*, 114*b'* are excluded, so that empty compartments are included that can optionally house vibration motors, one or more weights, etc. In another embodiment, the compartments are excluded (see FIG. 18).

FIG. 14 shows the controller 100' with the face plate 104' removed to expose the top surface 112' of the body 102'. In the illustrated embodiment, the directional pad unit 111' that includes the directional pad control input 108' is removably coupled in a compartment 116' in the body 102'. The directional pad unit 111' can removably couple to the body 102' with a coupling mechanism, optionally a mechanical coupling mechanism.

Optionally, the directional pad unit 111' can removably couple to the body 102' via one or more clips 118' in the compartment 116' that releasably engage corresponding members (e.g., tabs, ridges, etc.) on the directional pat unit 111'. The directional pad unit 111' can optionally be aligned with one or more features in the compartment 116' (e.g., with one or more alignment slots), and advanced linearly into the compartment 116' until the directional pad unit 111' fixedly couples to the body 102' (e.g., clicks or snaps into place).

Alternative mechanisms for coupling the directional pad unit 111' in the compartment 116', such as a slot and key mechanism, a twist-lock mechanism, a threaded mechanism, can be used. In still another embodiment, the coupling mechanism can be a magnetic coupling mechanism, where one or more magnets are disposed in the compartment 116' or the directional pad unit 111' to engage one or more metal components in the directional pad unit 111' to the compartment 116'. Though not shown, one or more contacts (e.g., pins), similar to contacts 120, that can extend into the compartment 116' to effect an electrical contact between the directional pad unit 111' and the electronics (e.g., printed circuit board) housed in the body 102' under the top surface 112' when the directional pad unit 111' is installed in the compartment 116'.

Advantageously, the removable face plate 104' and coupling mechanism between the directional pad unit 111' and the compartment 116' (e.g., the clips 118') facilitate the removal and replacement of the directional pad unit 111', such as to service the directional pad unit 111' or replace a malfunctioning unit 111'. Moreover, since only the face plate 104' needs to be removed to replace the directional pad unit 111', the directional pad unit 111' can be easily and quickly replaced, without having to disassemble the body 102' of the controller 100' (e.g., without removing the top surface 112' from the rest of the body 102'). Advantageously, the directional pad unit 111' is substantially similar to the directional pad unit 111, so that the same directional pad unit can be used in the controller 100 and the controller 100', thereby simplifying the process of replacing control units in different controllers that are adapted for use with different video game console systems.

With continued reference to FIGS. 13-14, the thumbstick input control 106' can have a mechanical cover 105' that can be removed once the face plate 104' has been decoupled from the body 102' of the controller 100'. Though not shown, the mechanical cover 105' can have substantially the same shape as the mechanical cover 105 of the controller 100, and removal of the mechanical cover 105' can expose an underlying thumbstick unit (e.g., similar to the thumbstick unit 122 having post 124). The mechanical cover 105' can slide over and frictionally engage a post of the thumbstick unit. Advantageously, the removable face plate 104' and mechanical cover 105' facilitate the servicing and/or modification of the thumbstick control input 106'. For example, different covers 105' can be installed on the underlying thumbstick unit (e.g., having different shapes or materials for the contact pads 107', different heights for the thumbstick, etc.). Additionally, the underlying thumbstick unit can be serviced. Moreover, since only the face plate 104' needs to be removed to replace the mechanical cover 105' for the thumbstick control unit 106', the cover 105' can be easily and quickly replaced, without having to disassemble the body 102' of the controller 100' (e.g., without removing the top surface 112' from the rest of the body 102').

Figure 11:
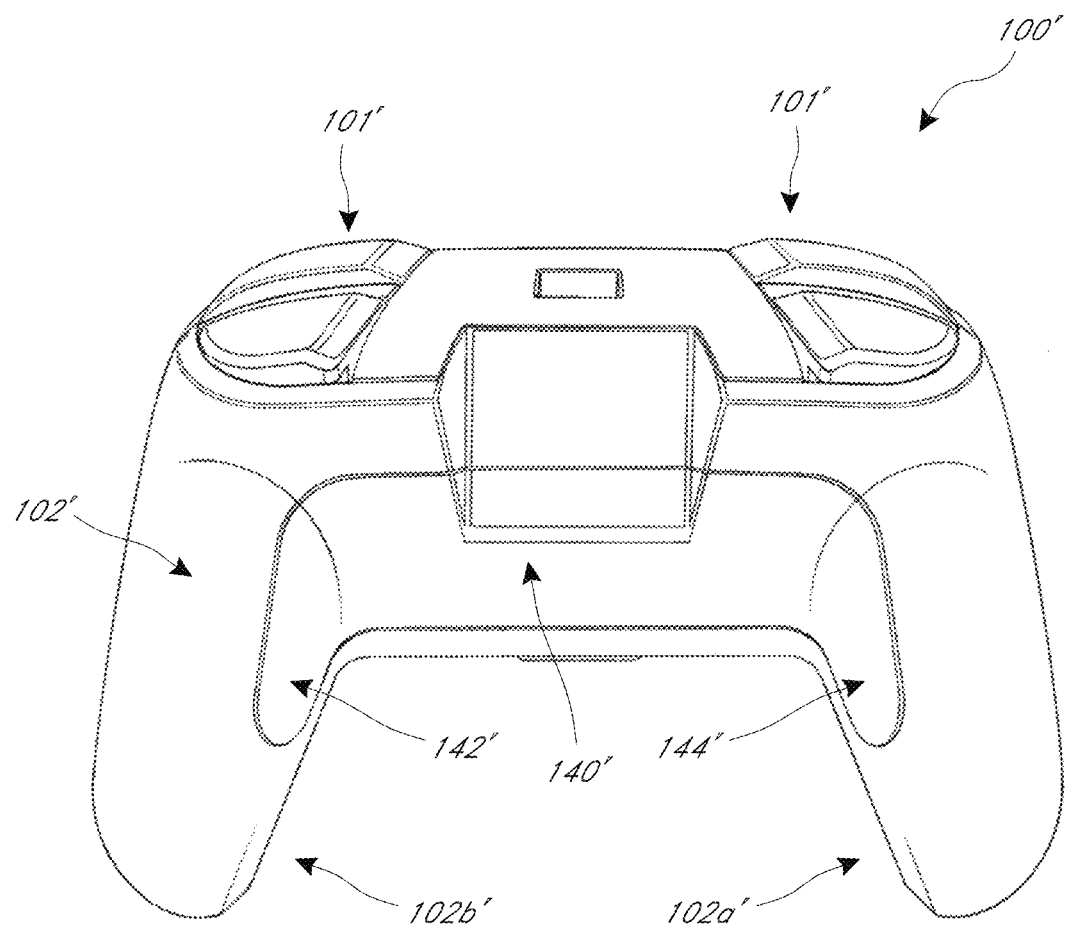
FIG. 11 is a bottom view of the video game controller of FIG. 9.
Figure 12:
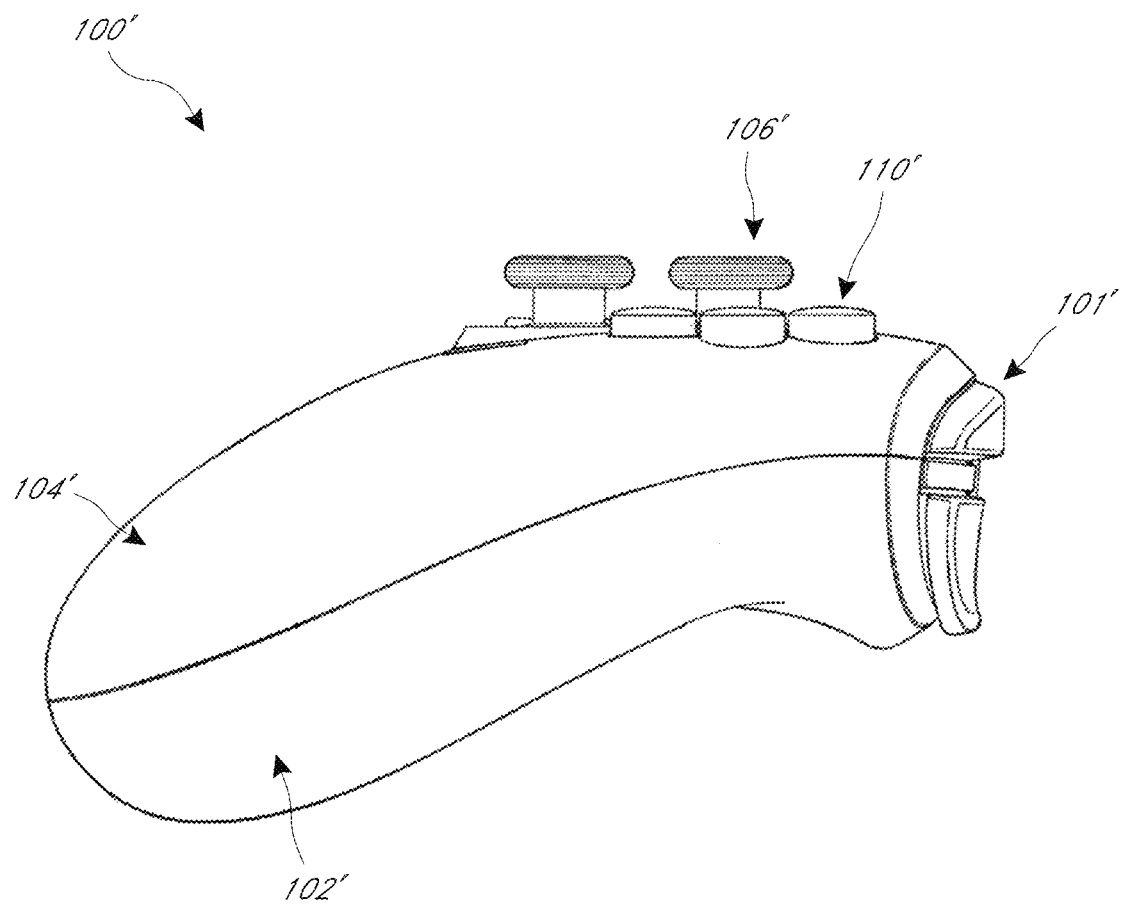
FIG. 12 is a side view of the video game controller of FIG. 9.

FIG. 11 shows a back side of the controller 100' with a paddle unit 140' that can be engaged by the user's fingers to generate one or more signals that can be communicated to the video game console to effect a command in the video game. The paddle unit 140' can optionally be a single piece. The paddle unit 140' can optionally have a pair of wings 142', 144', where the user can generate a command signal by pressing one or both of the pair of wings 142', 144'. The paddle unit 140' is optionally removable to expose a bottom surface of the body 102' and one or more switch mechanisms (e.g., levers, such as levers 115a, 115b in controller 100) that are actuated when the paddle unit 140' is pressed (e.g., when one or both of the wings 142', 144' are pressed) by the user, which can actuate one or more switches disposed within the body 102' under the bottom surface of the body 102'. The paddle unit 140' can advantageously be easily replaced (e.g., with paddle units having different ornamental designs, materials or shapes), thereby further allowing for the customization of the controller 100'. Moreover, the ease in removing the paddle unit 140' allows access to the bottom of the controller 100' to facilitate servicing of one or more components on the underside of the controller 100', such as one or more switches that are engaged by the paddle unit 140'.

FIGS. 16-20 show another embodiment of a video game controller 100" (the "controller"). The controller 100" is constructed in a similar manner as the controller 100' shown in FIGS. 9-15, except as noted below. Therefore, the reference numerals and description used to designate the various components of the controller 100" are identical to those used for identifying the corresponding components of the controller 100' in FIGS. 9-15, except that a """ has been added to the reference numerals. The controller 100" can be adapted for use with a Nintendo® video game console system.

Figure 17:
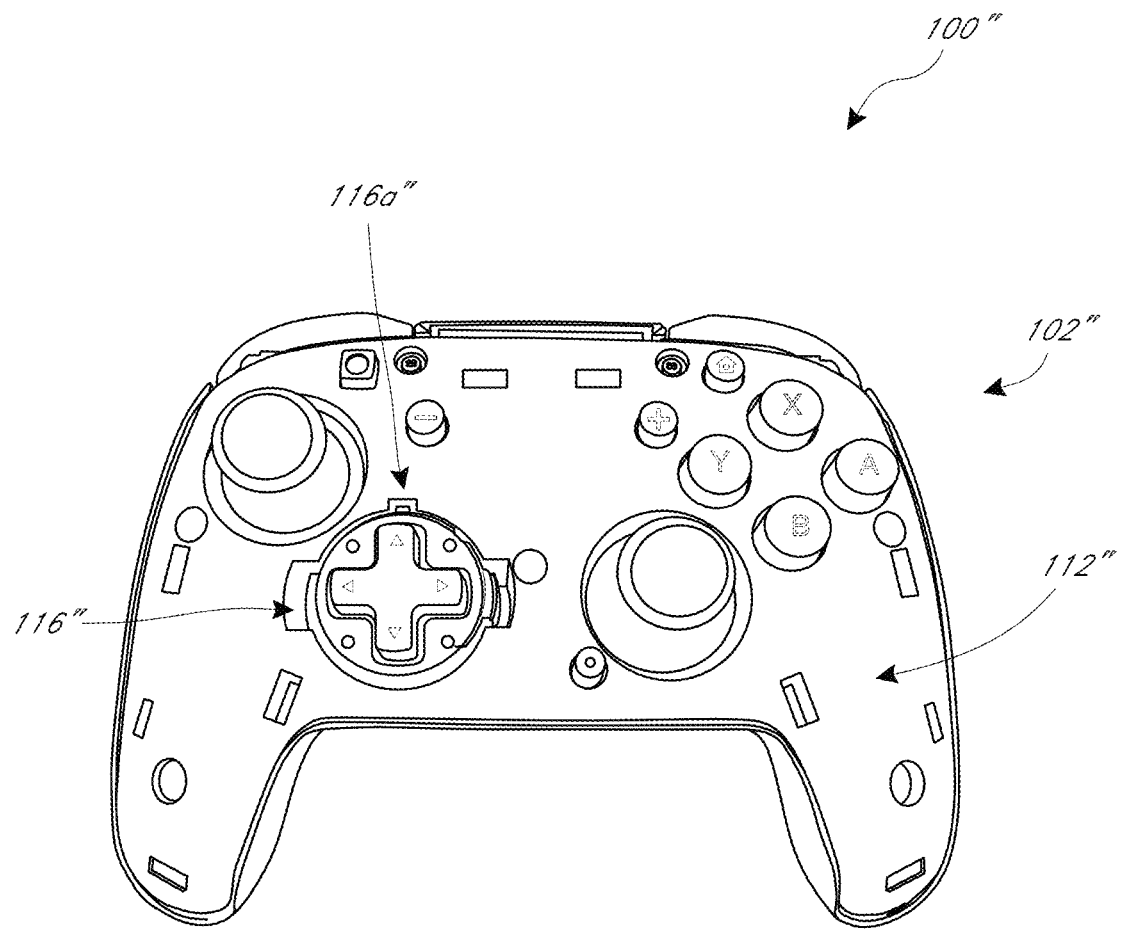
FIG. 17 is a top view of the video game controller of FIG. 16 with the face plate removed.

FIG. 17 shows the controller 100" with the face plate 104" removed from the body 102". In the illustrated embodiment, the body 102" does not have any covers in the handles 102a", 102b" like the covers 114a', 114b' in controller 100'. Additionally, the compartment 116" that receives the directional pad unit 111" has an alignment slot 116a" to facilitate aligning of the directional pad unit 111" with the compartment 116" before advancing and installing the directional pad unit 111" in the compartment 116".

Figure 18:
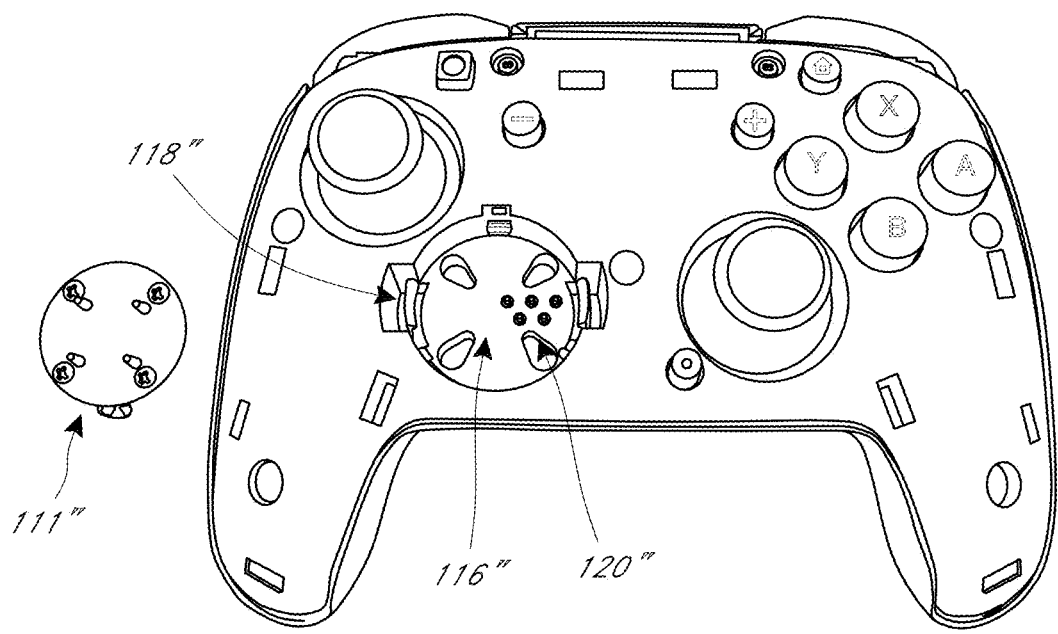
FIG. 18 is a top view of the video game controller of FIG. 17 with a directional pad removed from a recessed slot in the body of the controller.

FIG. 18 shows the controller 100" with the face plate 104" removed from the body 102" and the directional pad unit 111" removed from the compartment 116". The compartment 116" has one or more clips 118" that releasably engage corresponding members (e.g., surfaces, tabs, ridges, etc.) on the directional pad unit 111". One or more contacts 120" (e.g., pins) can extend into the compartment 116" to effect an electrical contact between the directional pad unit 111" and the electronics (e.g., printed circuit board) housed in the body 102" under the top surface 112" when the directional pad unit 111" is installed in the compartment 116". The directional pad unit 111" is substantially similar to the directional pad unit 111', 111, allowing for the use of the same directional pad unit in any of the controllers 100, 100', 100".

Figure 19:
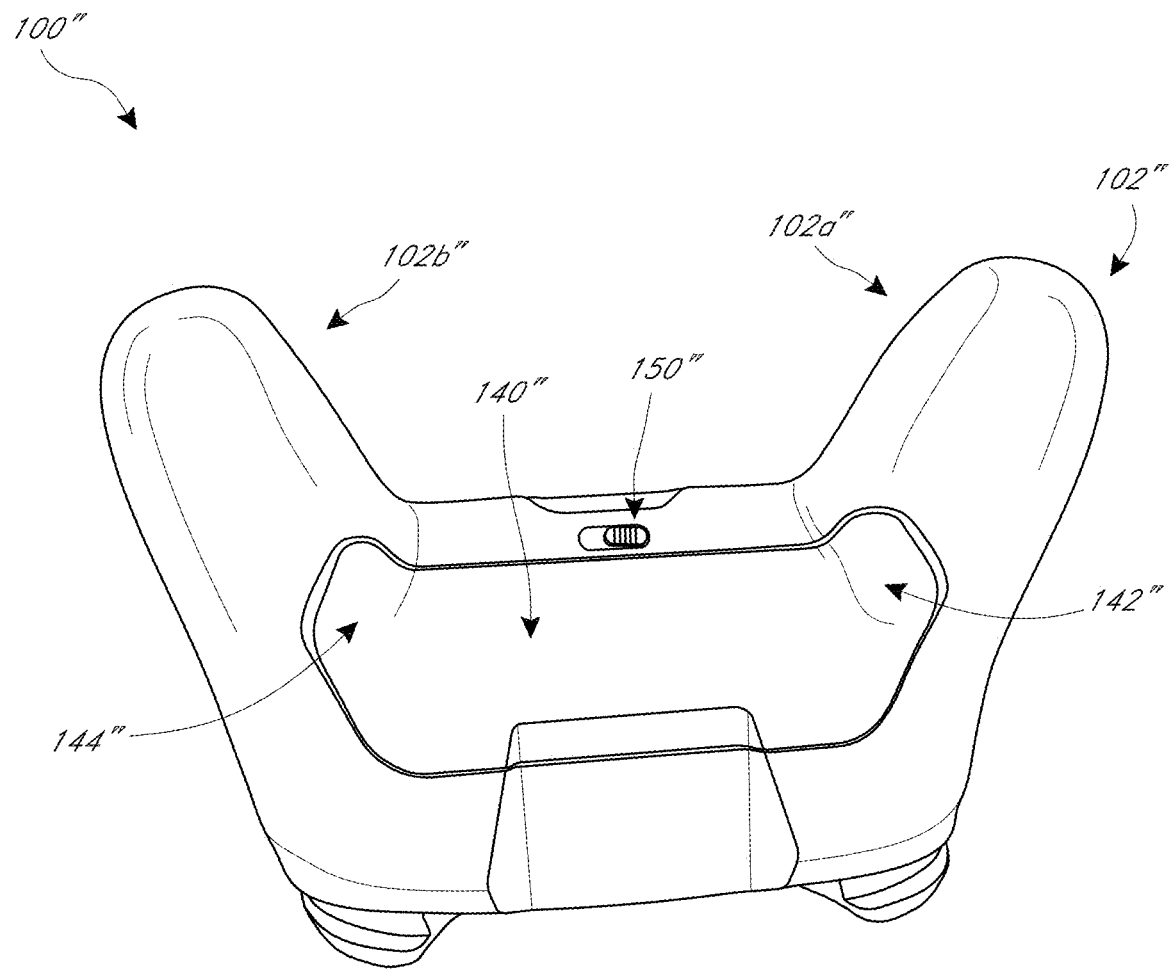
FIG. 19 is a bottom view of the video game controller of FIG. 16.
Figure 20:
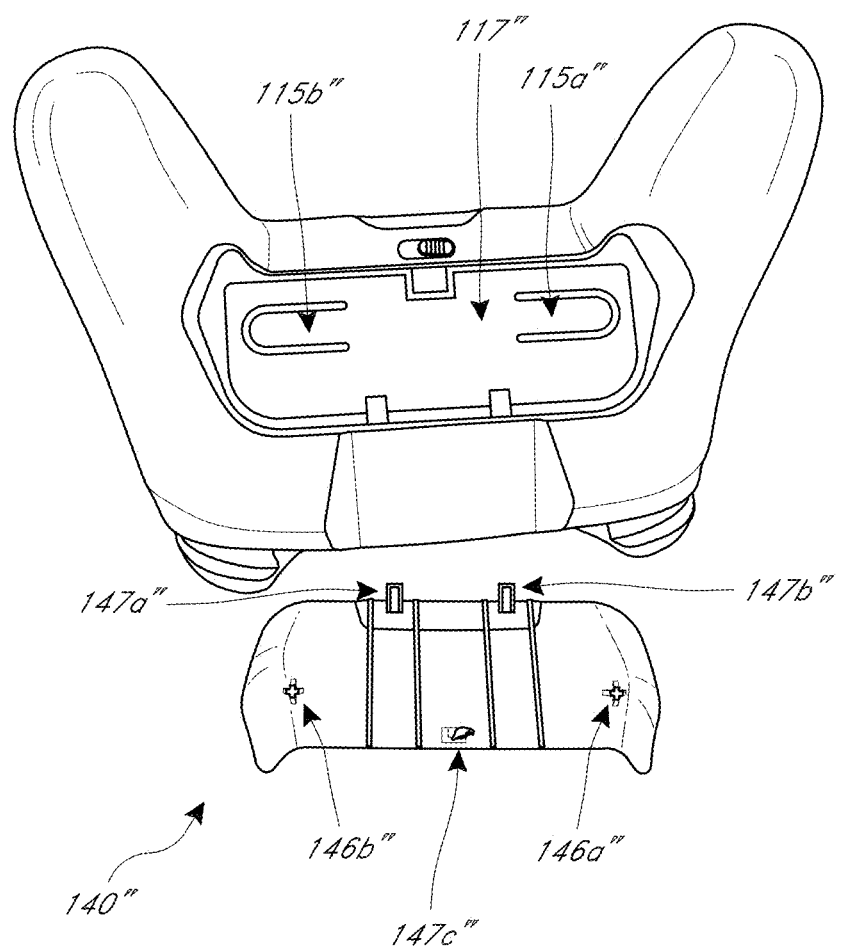
FIG. 20 is a bottom view of the video game controller of FIG. 16 with a paddle panel removed.

FIGS. 19-20 shows a back side of the controller 100" with a paddle unit 140" that can be engaged by the user's fingers to generate one or more signals that can be communicated to the video game console to effect a command in the video game. The paddle unit 140" can optionally be a single piece. The paddle unit 140" can optionally have a pair of wings 142", 144", where the user can generate a command signal by pressing one or both of the pair of wings 142", 144". A locking switch 150" on the body 102" can removably engage (e.g., lock) a member (e.g., lever) on an underside of the paddle unit 140". The switch 150" can be actuated (e.g., slid) to unlock the paddle unit 140" allowing it to be removed, thereby exposing a bottom surface 117" of the body 102" that is disposed under the paddle unit 140". One or more levers 115a", 115b" can be disposed on the bottom surface 117" (e.g., extending substantially perpendicular to the central axis of the controller 100"). The paddle unit 140" can engage the levers 115a", 115b" (e.g., with protrusions 146a", 146b") when pressed (e.g., when one of both of the wings 142", 144" are pressed), which can actuate one or more switches disposed within the body 102" under the bottom surface 117". The paddle unit 140" can advantageously be easily replaced (e.g., with paddle units having different ornamental designs, materials or shapes), thereby further allowing for the customization of the controller 100". Moreover, the ease in removing the paddle unit 140" allows access to the bottom of the controller 100" to facilitate servicing of one or more components on the underside of the controller 100", such as the switches that are engaged by the levers 115a", 115b". As best shown in FIG. 20, the paddle unit 140" can have protrusions 147a", 147b", 147c" that allow it to couple to the body 102" (e.g., couple to openings in the bottom surface 117").

Advantageously, the video game controller 100, 100', 100" has various features that facilitate the serviceability of the controller 100, 100', 100", thereby facilitating repairs to controllers (e.g., when one or more input controls are malfunctioning or have worn out) and inhibiting the need to buy a new controller which can be a significant expense. Additionally, the controller 100, 100', 100" has a removable face plate 104, 104', 104" that allows access to the control inputs (e.g., thumbsticks 106, 106', 106"; directional pads 108, 108', 108"; buttons 110, 110', 110") to service or modify them (e.g., replace them with control inputs having different shapes, heights, materials, etc.). Further, the removable/replaceable control units (e.g., thumbstick mechanical covers 105, 105', 105", directional pad units 111, 111', 111", etc.) in the controllers 100, 100', 100" are advantageously substantially similar in shape, allowing the same control input (e.g., thumbsticks 106, 106', 106"; directional pads 108, 108', 108"; buttons 110, 110', 110") to be used in any controller 100, 100', 100", thereby avoiding having to purchase or use different directional pad control inputs 108, 108', 108" for the different controllers 100, 100', 100", thereby simplifying the serviceability of the controllers 100, 100', 100". Additionally, the removable paddle unit 140, 140', 140" can advantageously facilitate the adjustment of the operability of one or more control inputs. In one embodiment, the travel of the triggers 101, 101' can be mechanically adjusted, for example by moving (e.g., sliding) a switch or lever 119a, 119b accessible by removing the paddle unit 140, 140', where the switch or lever 119a, 119b is mechanically coupled to the trigger mechanism, thereby allowing the user to adjust the travel motion of the trigger required to generate the signal (e.g., "shot" signal) to the video game console. Optionally, the removable cover or paddle unit 140, 140', 140" (e.g., when decoupled from the body 102, 102', 102") allows the trigger stops (actuated by the switch or lever 119a, 119b) to be engaged, disengaged or removed completely. Optionally, one or more of the switch or lever 119a, 119b can be removed and/or replaced when the removable cover or paddle unit 140, 140', 140" is decoupled from the body 102, 102', 102".

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the invention need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed controllers.

What is claimed is:

1. A video game controller, comprising:
   a controller body having a top surface and a bottom surface and a pair of handles;
   a plurality of control inputs comprising one or more thumbsticks, one or more of the plurality of control inputs removably mounted on the controller body through the top surface to releasably connect with electronics disposed within the controller body below the top surface of the controller body, each of the plurality of control inputs operable to control one or more operations of the video game controller;
   a face plate having a plurality of openings and being removably coupleable to the controller body so that the plurality of control inputs extend through the plurality of openings in the face plate when the face plate is coupled to the controller body; and
   a detachable paddle unit removably coupled to an underside of the controller body, one or more portions of the paddle unit being movable relative to the bottom surface of the controller body,
   wherein one or more of the plurality of control inputs are removable and replaceable by decoupling the face plate from the controller body and decoupling said one or more of the plurality of control inputs from the controller body without disassembling the controller body.

2. The video game controller of claim 1, wherein the plurality of control inputs comprises one or more directional pads and one or more buttons.

3. The video game controller of claim 1, wherein the one or more thumbsticks are interchangeable thumbsticks having different heights or shapes.

4. The video game controller of claim 1, wherein said one or more of the plurality of control inputs are mechanically coupled to the controller body.

5. The video game controller of claim 1, wherein said one or more of the plurality of control inputs is installed by aligning the control input with a compartment in the controller body and linearly advancing the control input into the compartment.

6. The video game controller of claim 1, further comprising one or more depressible triggers coupled to a front surface of the controller body, the one or more depressible triggers having an adjustable travel distance.

7. The video game controller of claim 6, further comprising one or more movable levers actuatable to adjust the travel distance of the one or more depressible triggers.

8. The video game controller of claim 7, wherein the one or more movable levers are configured to slide relative to the bottom surface of the controller body to adjust the travel distance of the one or more depressible triggers.

9. The video game controller of claim 1, wherein a protrusion of the paddle unit selectively engages a portion of the controller body to couple the paddle unit to the controller body, the protrusion configured to selectively disengage from the controller body to allow the paddle unit to be detached from the controller body.

10. The video game controller of claim 1, wherein the face plate is magnetically coupled to the controller body.

11. A video game controller kit, comprising:
    a video game controller comprising
       a controller body having a top surface and a bottom surface and a pair of handles,
       a plurality of control inputs comprising one or more thumbsticks, one or more of the plurality of control inputs removably mounted on the controller body through the top surface to releasably connect with electronics disposed within the controller body below the top surface of the controller body, each of the plurality of control inputs operable to control one or more operations of the video game controller,
       a face plate having a plurality of openings and being removably coupleable to the controller body so that the plurality of control inputs extend through the plurality of openings in the face plate when the face plate is coupled to the controller body, and
       a detachable paddle unit removably coupled to an underside of the controller body, one or more portions of the paddle unit being movable relative to the bottom surface of the controller body; and
    a plurality of replacement control inputs configured to replace one or more of the plurality of control inputs,
    wherein one or more of the plurality of control inputs are removable and replaceable by decoupling the face plate from the controller body and decoupling said one or more of the plurality of control inputs from the controller body without disassembling the controller body.

12. The video game controller of claim 11, wherein the plurality of control inputs comprises one or more directional pads and one or more buttons.

13. The video game controller of claim 11, wherein the one or more thumbsticks are interchangeable thumbsticks having different heights or shapes.

14. The video game controller of claim 11, wherein said one or more of the plurality of control inputs are mechanically coupled to the controller body.

15. The video game controller of claim 11, wherein said one or more of the plurality of control inputs is installed by aligning the control input with a compartment in the controller body and linearly advancing the control input into the compartment.

16. The video game controller of claim 11, further comprising one or more depressible triggers coupled to a front surface of the controller body, the one or more depressible triggers having an adjustable travel distance.

17. The video game controller of claim 16, further comprising one or more movable switches actuatable to adjust the travel distance of the one or more depressible triggers.

18. The video game controller of claim 17, wherein the one or more movable levers are configured to slide relative to the bottom surface of the controller body to adjust the travel distance of the one or more depressible triggers.

19. The video game controller of claim 11, wherein a protrusion of the paddle unit selectively engages a portion of the controller body to couple the paddle unit to the controller body, the protrusion configured to selectively disengage from the controller body to allow the paddle unit to be detached from the controller body.

20. The video game controller of claim 11, wherein the face plate is magnetically coupled to the controller body.

* * * * *

UNITED STATES PATENT AND TRADEMARK OFFICE
CERTIFICATE OF CORRECTION

PATENT NO.       : 10,874,938 B2                                   Page 1 of 1
APPLICATION NO.  : 16/573929
DATED            : December 29, 2020
INVENTOR(S)      : Strahle et al.

It is certified that error appears in the above-identified patent and that said Letters Patent is hereby corrected as shown below:

In the Specification

In Column 1, Line 67, delete "P54" and insert -- PS4 --.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*